(12) United States Patent
Qiu et al.

(10) Patent No.: US 12,204,522 B2
(45) Date of Patent: Jan. 21, 2025

(54) DATA PROCESSING METHODS AND SYSTEMS FOR DETERMINING A SERVICE TARGET ITEM

(71) Applicant: Tencent Technology (Shenzhen) Company Limited, Shenzhen (CN)

(72) Inventors: Zhijie Qiu, Shenzhen (CN); Ruobing Xie, Shenzhen (CN); Yi Liu, Shenzhen (CN); Jun Rao, Shenzhen (CN); Bo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 123 days.

(21) Appl. No.: 17/674,682

(22) Filed: Feb. 17, 2022

(65) Prior Publication Data
US 2022/0171760 A1     Jun. 2, 2022

Related U.S. Application Data

(63) Continuation of application No. PCT/CN2020/129886, filed on Nov. 18, 2020.

(30) Foreign Application Priority Data

Jan. 7, 2020 (CN) .......................... 202010014261.4

(51) Int. Cl.
G06F 16/23 (2019.01)
(52) U.S. Cl.
CPC .............................. G06F 16/2365 (2019.01)
(58) Field of Classification Search
CPC .................................................. G06F 16/2365
See application file for complete search history.

(56) References Cited

U.S. PATENT DOCUMENTS 9,510,050 B2 * 11/2016 Mukherjee ........... H04N 21/251
11,301,540 B1 * 4/2022 Boteanu ................ G06F 40/279
(Continued)

FOREIGN PATENT DOCUMENTS

CN         107193831 A      9/2017
CN         109992710 A      7/2019
(Continued)

OTHER PUBLICATIONS

McLaughlin, Oct. 15, 2020, "Stitching Together Matrices/Indexing Matrices" (Year: 2020).*
(Continued)

*Primary Examiner* — Matthew J Ellis
(74) *Attorney, Agent, or Firm* — Morgan, Lewis & Bockius LLP

(57) ABSTRACT

The present disclosure provides a data processing method performed by an electronic device. The method includes: obtaining first and second service behavior features, and a service scenario feature of an object from service history data associated with the object; generating first and second service embedding vectors and a scenario representation vector according to the first and second service behavior features and the service scenario feature; obtaining first and second weights of the first and second service embedding vectors according to the scenario representation vector and the first and second service embedding vectors; generating first and second service feature vectors according to the first and second service embedding vectors and the first and second weights of the first and second service embedding vectors, respectively; and obtaining an object embedding vector according to the first service feature vector and the second service feature vector.

19 Claims, 11 Drawing Sheets

(56) References Cited

U.S. PATENT DOCUMENTS

| | | | | |
|---|---|---|---|---|
| 2015/0331951 A1* | 11/2015 | Wang | ..................... | H04N 21/84 |
| | | | | 707/722 |
| 2018/0107917 A1* | 4/2018 | Hewavitharana | ... | G06F 16/2468 |
| 2018/0349477 A1* | 12/2018 | Jaech | ................... | G06F 16/9535 |
| 2019/0188564 A1 | 6/2019 | Lockett | | |
| 2021/0081503 A1* | 3/2021 | Tran | ......................... | G06N 3/08 |
| 2021/0271967 A1* | 9/2021 | Kadam | ............ | H04N 21/44204 |
| 2022/0092028 A1* | 3/2022 | Layton | .................. | G06F 16/164 |

FOREIGN PATENT DOCUMENTS

| | | | | |
|---|---|---|---|---|
| CN | 110110206 A | 8/2019 | | |
| CN | 110162690 A | 8/2019 | | |
| CN | 110297848 A | 10/2019 | | |
| CN | 110362751 A | 10/2019 | | |
| CN | 110472145 A | 11/2019 | | |
| CN | 110532472 A | 12/2019 | | |
| CN | 111241394 A | 6/2020 | | |
| EP | 3902277 A1 * | 10/2021 | ........... | G06F 16/435 |

OTHER PUBLICATIONS

Abadi et al. Nov. 2-4, 2016, "TensorFlow: A System for Large-Scale Machine Learning". (Year: 2016).*
Tencent Technology, ISR, PCT/CN2020/129886, Feb. 20, 2021, 2 pgs.
Tencent Technology, WO, PCT/CN2020/129886, Feb. 20, 2021, 4 pgs.
Tencent Technology, IPRP, PCT/CN2020/129886, Jul. 12, 2022, 5 pgs.

* cited by examiner

DATA PROCESSING METHODS AND SYSTEMS FOR DETERMINING A SERVICE TARGET ITEM

CROSS-REFERENCE TO RELATED APPLICATIONS

This application is a continuation application of PCT Patent Application No. PCT/CN2020/129886, entitled "DATA PROCESSING METHOD AND APPARATUS, COMPUTER READABLE STORAGE MEDIUM, AND ELECTRONIC DEVICE" filed on Nov. 18, 2020, which claims priority to Chinese Patent Application No. 202010014261.4, filed with the State Intellectual Property Office of the People's Republic of China on Jan. 7, 2020, and entitled "DATA PROCESSING METHOD AND DEVICE, COMPUTER READABLE STORAGE MEDIUM AND ELECTRONIC EQUIPMENT", all of which are incorporated herein by reference in their entirety.

FIELD OF THE TECHNOLOGY

The present disclosure relates to the field of computer technologies, and specifically, to a data processing method and apparatus, a non-transitory computer-readable storage medium, and an electronic device.

BACKGROUND OF THE DISCLOSURE

In some application platforms, there may be a plurality of different service recommendation scenarios at the same time. Users consume various contents on a platform. The same user usually has different consumption behaviors for different services on the platform. However, a recommendation system in the related art cannot simultaneously take mutual influence between these different services into consideration during a matching stage, and does not consider the influence of a service scenario that the user is in on different services. Consequently, a matched item is inaccurate, and the accuracy of a final recommendation result is affected.

The information disclosed in the above background part is used only for enhancing the understanding of the background of the present disclosure, and therefore may include information that does not constitute the related art known to a person of ordinary skill in the art.

SUMMARY

An objective of embodiments of the present disclosure is to provide a data processing method and apparatus, a non-transitory computer-readable storage medium, and an electronic device, to further overcome, at least to some extent, the problem that a matched item is inaccurate in a multi-service scenario in the related art.

Other characteristics and advantages of the present disclosure become apparent from the following detailed description, or may be learned in part through the practice of the present disclosure.

According to an aspect of the embodiments of the present disclosure, a data processing method is provided, including: obtaining a first service behavior feature, a second service behavior feature, and a service scenario feature of an object from service history data associated with the object; generating a first service embedding vector according to the first service behavior feature, generating a second service embedding vector according to the second service behavior feature, and generating a scenario representation vector according to the service scenario feature; obtaining a first weight of the first service embedding vector and a second weight of the second service embedding vector according to the scenario representation vector, the first service embedding vector, and the second service embedding vector; generating a first service feature vector according to the first service embedding vector and the first weight of the first service embedding vector, and generating a second service feature vector according to the second service embedding vector and the second weight of the second service embedding vector; obtaining an object embedding vector according to the first service feature vector and the second service feature vector; obtaining a plurality of first service candidate items; and determining a first service target item from the plurality of first service candidate items according to the object embedding vector.

According to an aspect of the embodiments of the present disclosure, a data processing apparatus is provided, including: a feature information obtaining unit, configured to obtain a first service behavior feature, a second service behavior feature, and a service scenario feature of an object from service history data associated with the object; a behavior scenario obtaining unit, configured to: generate a first service embedding vector according to the first service behavior feature, generate a second service embedding vector according to the second service behavior feature, and generate a scenario representation vector according to the service scenario feature; a service weight obtaining unit, configured to obtain a first weight of the first service embedding vector and a second weight of the second service embedding vector according to the scenario representation vector, the first service embedding vector, and the second service embedding vector; a service weight adjusting unit, configured to: generate a first service feature vector according to the first service embedding vector and the first weight of the first service embedding vector, and generate a second service feature vector according to the second service embedding vector and the second weight of the second service embedding vector; an object vector obtaining unit, configured to obtain an object embedding vector according to the first service feature vector and the second service feature vector; a candidate information obtaining unit, configured to obtain a plurality of first service candidate items; and a target item determining unit, configured to determine a first service target item from the plurality of first service candidate items according to the object embedding vector.

According to an aspect of the embodiments of the present disclosure, a non-transitory computer-readable storage medium is provided, storing one or more computer programs, the one or more computer programs, when executed by a processor of an electronic device, causing the electronic device to implement the data processing method according to the foregoing embodiments.

According to an aspect of the embodiments of the present disclosure, an electronic device is provided, including: one or more processors; and a storage apparatus, configured to store one or more programs, the one or more programs, when executed by the one or more processors, causing the electronic device to implement the data processing method according to the foregoing embodiments.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. Apparently, the accompanying drawings in the following description show merely some embodiments of the present disclosure, and a person of ordinary skill in the art may still derive other drawings from these accompanying drawings without creative efforts. In the accompanying drawings.

DESCRIPTION OF EMBODIMENTS

Exemplary implementations will now be described more thoroughly with reference to the accompanying drawings. However, the exemplary implementations can be implemented in various forms and are not to be construed as being limited to the examples set forth herein. Rather, the implementations are provided so that the present disclosure can be more comprehensive and complete, and the concepts of the exemplary implementations are fully conveyed to a person skilled in the art.

In addition, the described features, structures or characteristics may be combined in one or more embodiments in any appropriate manner. In the following descriptions, many specific details are provided to obtain a thorough understanding of the embodiments of the present disclosure. However, a person of skill in the art is to be aware that, the technical solutions in the present disclosure may be implemented without one or more of the particular details, or another method, element, material, apparatus, step, and the like may be used. In other cases, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
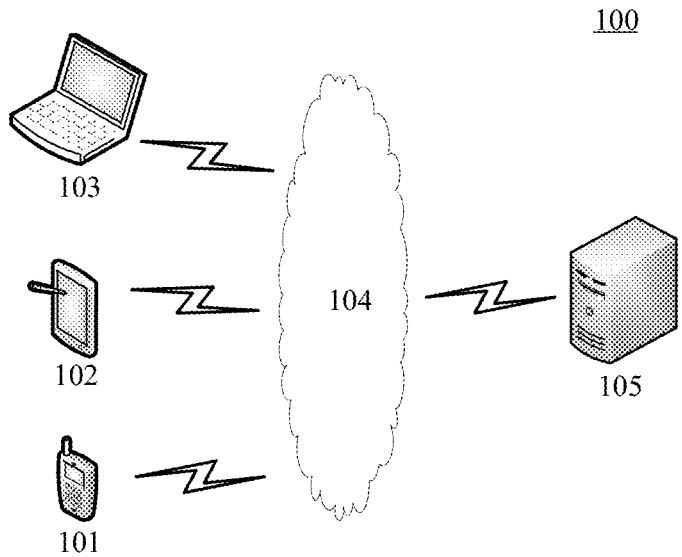
FIG. 1 is a schematic diagram of an exemplary system architecture to which a data processing method or a data processing apparatus according to an embodiment of the present disclosure may be applied.

FIG. 1 is a schematic diagram of an exemplary system architecture 100 to which a data processing method or a data processing apparatus according to an embodiment of the present disclosure may be applied.

As shown in FIG. 1, the system architecture 100 may include one or more of terminal devices 101, 102, and 103, a network 104, and a server 105. The network 104 is a medium configured to provide a communication link between the terminal devices 101, 102, and 103 and the server 105. The network 104 may include various connection types, for example, a wired or wireless communication link, or an optical fiber cable.

It is to be understood that quantities of the terminal devices, the network, and the server in FIG. 1 are merely exemplary. There may be any quantities of terminal devices, networks, and servers according to an implementation requirement. For example, the server 105 may be a server cluster including a plurality of servers, a cloud server, or the like.

A user may use the terminal devices 101, 102, and 103 to interact with the server 105 via the network 104 to receive or send messages or the like. The terminal devices 101, 102, and 103 may be various electronic devices having display screens, including but not limited to a smartphone, a tablet computer, a portable computer, a wearable smart device, a smart home device, a desktop computer.

The server 105 may be a server that provides various services. For example, the server 105 may obtain a first service behavior feature and a second service behavior feature of a user and obtain a service scenario feature of a service scenario that the user is currently in according to behavior of the user performed on a first service and a second service on the terminal device 103 (or the terminal device 101 or 102). The server 105 may: generate a first service embedding vector according to the first service behavior feature, generate a second service embedding vector according to the second service behavior feature, and generate a scenario representation vector according to the service scenario feature; obtain a first weight of the first service embedding vector and a second weight of the second service embedding vector according to the scenario representation vector, the first service embedding vector, and the second service embedding vector; generate a first service feature vector according to the first service embedding vector and the first weight of the first service embedding vector, and generate a second service feature vector according to the second service embedding vector and the second weight of the second service embedding vector; obtain an object embedding vector according to the first service feature vector and the second service feature vector; obtain a plurality of first service candidate items; and determine a first service target item from the plurality of first service candidate items according to the object embedding vector. The server 105 may further filter and rank the first service target item, and feed back the first service target item obtained by filtering to the terminal device 103 in a ranked order, so that the user can obtain a personalized recommendation result based on contents displayed on the terminal device 103.

Figure 2:
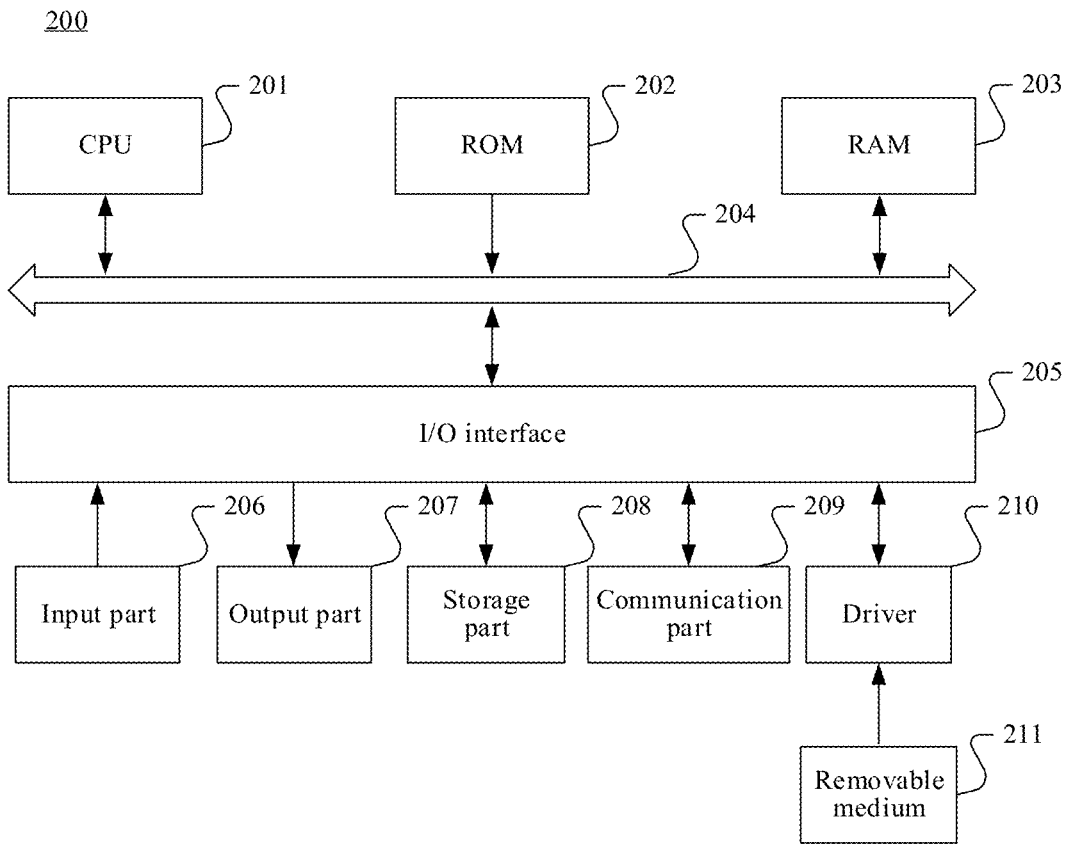
FIG. 2 is a schematic structural diagram of a computer system suitable for implementing an electronic device according to an embodiment of the present disclosure.

FIG. 2 is a schematic structural diagram of a computer system suitable for implementing an electronic device according to an embodiment of the present disclosure.

The computer system 200 of the electronic device shown in FIG. 2 is merely an example, and is not to impose any limitation on a function and use scope of the embodiments of the present disclosure.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data necessary for system operations. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; the storage part 208 including a hard disk or the like; and a communication part 209 of a network interface card including a LAN card, a modem, or the like. The communication part 209 performs communication processing by using a network such as the Internet. A driver 210 is also connected to the I/O interface 205 as needed. A removable medium 211, such as a magnetic disk, an optical disc, a magneto-optical disk, or a semiconductor memory, is installed on the driver 210 as required, so that a computer program read from the removable medium is installed into the storage part 208 as required.

Particularly, according to an embodiment of the present disclosure, the processes described in the following by referring to the flowcharts may be implemented as computer software programs. For example, the embodiments of the present disclosure include a computer program product, including a computer program carried on a non-transitory computer-readable storage medium. The computer program includes program code used for performing the methods shown in the flowcharts. In such an embodiment, the computer program may be downloaded from a network via the communication part 209 and installed, and/or installed from the removable medium 211. When the computer program is executed by the CPU 201, the various functions defined in the system of this application are executed.

The computer-readable storage medium shown in the present disclosure may be a computer-readable signal medium or a computer-readable storage medium or any combination thereof. The computer-readable storage medium may be, for example, an electric, magnetic, optical, electromagnetic, infrared, or semi-conductive system, apparatus, or component, or any combination thereof. More specifically, the computer-readable storage medium may include, for example, but is not limited to, an electrical connection having one or more wires, a portable computer disk, a hard disk, a RAM, a ROM, an erasable programmable read-only memory (EPROM) or flash memory, an optical fiber, a portable compact disc read-only memory (CD-ROM), an optical storage device, a magnetic storage device, or any suitable combination of the foregoing. In the present disclosure, the computer-readable storage medium may be any tangible medium including or storing a program, and the program may be used by or in combination with an instruction execution system, apparatus, or device. In the present disclosure, the computer-readable signal medium may include a data signal being in a baseband or propagated as a part of a carrier, the data signal carrying computer-readable program code. A data signal propagated in such a way may assume a plurality of forms, including, but not limited to, an electromagnetic signal, an optical signal, or any appropriate combination thereof. The computer-readable signal medium may be alternatively any computer-readable storage medium other than the computer-readable storage medium. The computer-readable storage medium may send, propagate, or transmit a program for use by or in combination with an instruction execution system, apparatus, or device. The program code contained in the computer-readable storage medium may be transmitted by using any appropriate medium, including but not limited to: a wireless medium, a wire, an optical cable, RF, or any suitable combination thereof.

Flowcharts and block diagrams in the accompanying drawings illustrate system architectures, functions, and operations that may be implemented by using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

As another aspect, this application further provides a non-transitory computer-readable storage medium. The computer-readable storage medium may be included in the electronic device described in the foregoing embodiments, or may exist alone and is not disposed in the electronic device. The computer-readable storage medium carries one or more programs, the one or more programs, when executed by the electronic device, causing the electronic device to implement the method described in the following embodiments. For example, the electronic device may implement steps shown in FIG. 3, FIG. 4, FIG. 5, FIG. 6, FIG. 7, FIG. 9, FIG. 10, FIG. 11, or FIG. 13.

Artificial intelligence (AI) is a theory, method, technology, and application system that uses a digital computer or a machine controlled by the digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

ML is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a smart home, a smart wearable device, a virtual assistant, a smart speaker, smart marketing, unmanned driving, automatic driving, an unmanned aerial vehicle, a robot, smart medical care, and smart customer service that are common. It is believed that with the development of technologies, the AI technology will be applied to more fields, and play an increasingly important role.

The solutions provided in the embodiments of this application relate to technologies such as ML of AI, and are specifically described by using the following embodiments.

First of all, descriptions are provided for some terms involved in the embodiments of the present disclosure.

A short video is a video content played on various media platforms, suitable for being watched in a moving state and short-time leisure state, and pushed frequently with a play duration generally within a range of several seconds to several minutes.

A short video is generally of a play duration shorter than that of a short video and can be produced more conveniently. Generally, a play duration of a short video is within a range of over ten seconds to 1 minute.

A tag is a type of keyword tag that can be used to express the topic content of a service. For example, for an article, one word/one group of words indicating the core content of the article may be extracted from the body and/or the title of the article. For example, the keywords of an article introducing performance comparison of mobile phones in China may be "mobile phone", "China", "performance", or the like. In another example, for a video, one word/one group of words that can express the key content of the video may be extracted from the name and/or the plot introduction of the video. For example, the keywords of a story shot according to Strange Tales from a Chinese Studio may be "Strange Tales from a Chinese Studio", "Painted Skin", or the like.

A category (referred to as Cate for short in the following) is an abstract description of a service, which maps a plurality of items describing similar contents in the same service to the same Cate. For example, for an article, a plurality of articles describing similar contents may be sorted into the same Cate, such as fun, sports, news, and finance and economics. In another example, for a video, a plurality of videos narrating similar contents may be sorted into the same Cate, such as martial arts, entertainment, variety shows, and information.

An item is a consumption (such as reading, watching, or the like) unit in a service, which has different specific meanings in different service scenarios. For example, for an article service, an article is an item. In another example, for a video service, a video is an item. In still another example, for a short video service, a short video is an item. In yet another example, for a short video service, a short video is an item.

Encoding is encoding inputted data into a vector.

Decoding is predicting a possible outputted item in combination with the vector generated by encoding. In the embodiments of the present disclosure, decoding is predicting a next item through a behavior encoding vector (that is, an object embedding vector) of a user.

A cosine similarity is a similarity between two vectors estimated by calculating a cosine value of an angle between the two vectors. The vectors are drawn into a vector space, such as a most common two-dimensional space, according to the cosine similarity and coordinate values of the vectors.

Self-attention: In a self-attention mechanism, data for calculating relevance is data of the same source.

Attention: In an attention mechanism, differences in relevance distribution are obtained by performing relevance calculation on a plurality of pieces of data, so that more attention can be paid to a more important part.

Cold start: In the field of data analysis in the Internet environment, a large amount of data has not been accumulated at the beginning. Therefore, data requires to be accumulated in an early stage for further mining and analysis. The stage is generally referred to as cold start. In the embodiments of the present disclosure, the early stage in which a large number of user consumption behaviors has not been accumulated for a new service and recommendation of the new service cannot be performed based on the user consumption behaviors of the new service is referred to as cold start of the new service.

Matching is filtering a large number (such as millions or tens of millions) of items to obtain a relatively small number (such as hundreds or thousands) of items for a subsequent ranking model to perform ranking.

In a personalized recommendation scenario, there may be many different service recommendation scenarios at the same time, for example, including and not limited to article recommendation, video (a video herein is different from a short video and a short video, and may be referred to as a long video in the following embodiments) recommendation, short video recommendation, short video recommendation, and the like. A user uses an application (APP) such as an instant messaging APP to consume various contents, and the same user usually has different service consumption behaviors.

In the related art, for the foregoing scenarios, a provided recommendation method is to use the information of a single service for recommendation of the single service, that is, only use a behavior feature inside the service. For example, when it is required to recommend an article to a user, only information of historical article reading behaviors of the user is used to train a prediction model to complete article recommendation. When it is required to recommend a long video to a user, only information of historical long video watching behaviors of the user is used to train another prediction model to complete long video recommendation. When it is required to recommend a short video to the user, only information of historical short video watching behaviors of the user is used to train still another prediction model to complete short video recommendation.

When the solutions in the foregoing related art are adopted, there are at least the following two problems:

First, when a system is faced with the problem of multi-service personalized recommendation, independent models need to be separately developed for different services. Therefore, a plurality of models need to be run and maintained simultaneously online, which consumes a relatively large number of computational resources and occupies a relatively large storage space. In addition, calling and management are relatively complex.

Second, in a practical case, new service scenarios may be merged into an information flow at any time, which brings about the problem of cold start recommendation for new services. For example, assuming that short video is a new service herein, since there is relatively little accumulated information of historical short video watching behaviors of a user, there is relatively little sample data used for training a corresponding prediction model. Therefore, the prediction accuracy of the model obtained by training is relatively low, and it is difficult to provide adequate personalized recommendation.

Based on the foregoing problems, a data processing method is provided in an embodiment of the present disclosure, to resolve the foregoing problems. Specifically, referring to FIG. 3, the data processing method is applicable to the electronic device described in the foregoing embodiment, and may include steps S310 to S370.

Step S310: Obtain a first service behavior feature, a second service behavior feature, and a service scenario feature of an object from service history data associated with the object.

In the embodiments of the present disclosure, a user is used as an example of the object for description, but the present disclosure is not limited thereto, and in different scenarios, the object may have different meanings. A first service and a second service may be any one of an article, a video, a short video, a short video, or the like. It is assumed herein that the article, video, and short video are relatively mature services on a platform, while the short video is a new service. In the following embodiments, an example in which an article is the first service and a video is the second service is used for description. However, the protection scope of the present disclosure is not limited thereto.

A user can read articles and watch videos on a platform. A first service behavior feature and a second service behavior feature of the user may be extracted from the reading history and watching history of the user. For example, the first service behavior feature may include a reading sequence and tag and category information of articles historically read by the user, and the second service behavior feature may include a play sequence and tag and category information of videos historically watched by the user.

In an exemplary embodiment, the service scenario feature may include a service type, a net type, and a channel ID.

The service type may be, for example, any one of an article, a video, a short video, a short video, or the like. For example, when the service type is "article", a next article that the user may be interested in is to be predicted currently, and when the service type is "short video", a next short video that the user may be interested in is to be predicted currently.

The net type may be, for example, a Wi-Fi environment. Different net types may also affect an item recommended to the user. For example, if the user is currently in a Wi-Fi environment, a video with a relatively long play duration may be recommended to the user, which does not cause stuttering when the video is played and does not waste the data of the user. If the user is currently in a non-Wi-Fi environment, a video with a relatively short play duration may be recommended to the user, to provide the user with smooth play experience.

The channel ID and the service type are both features related to a service scenario. The channel ID is a feature more detailed than the service type used for describing scenario information, and is used to express an information display page that the user is currently in. A service appears under at least one channel ID.

For example, a channel ID of the main page of an information flow may be set to "1" in advance, and the main page may include a video, a short video, a short video, and an article at the same time. When the user is currently in the main page, a next step may be recommending any one of a video, a short video, a short video, and an article to the user. When the user swipes the main page and is interested in a video, the user may tap the video to enter a video flow page. Assuming that a channel ID of the video flow page is set to "2" in advance, which indicates that the user is currently in a page with only videos, a next step may be recommending a video to the user. If a channel ID of a short video flow page is "3", which indicates the user is currently in a page with only short videos, a next step may be recommending a short video to the user. If a channel ID of a short video flow page is "4", which indicates the user is currently in a page with only short videos, a next step may be recommending a short video to the user.

In another example, video channel, novel channel, picture channel, hot issue channel, technology channel, entertainment channel, sports channel, game channel, anime channel, travel channel, finance and economics channel, auto channel, fashion channel, or the like may be set according to different contents and forms of information flows in advance. In addition, different channel IDs are respectively set for these channels. The user may switch to a selected channel, and view a corresponding information flow in the corresponding channel. In his case, a specific channel that the user is currently in can be known through a channel ID, to recommend an item of the corresponding channel to the user, thereby implementing more accurate personalized recommendation.

It may be understood that, in case of a different service, the service behavior features and the service scenario feature may change correspondingly, and are not limited to the foregoing examples.

Step S320: Generate a first service embedding vector according to the first service behavior feature, generate a second service embedding vector according to the second service behavior feature, and generate a scenario representation vector according to the service scenario feature.

Figure 4:
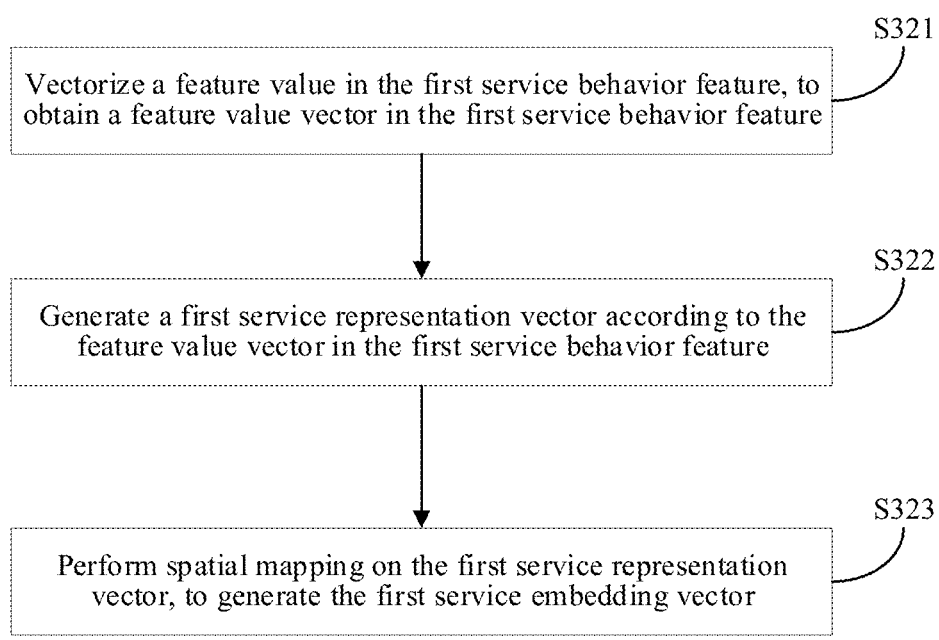
FIG. 4 is a schematic diagram of a processing process of step S320 shown in FIG. 3 in an embodiment.

For the specific generation of the first service embedding vector and the second service embedding vector, reference may be made to the embodiment in FIG. 4.

In an exemplary embodiment, the generating a scenario representation vector according to the service scenario feature may include: respectively vectorizing feature values in the service type, the net type, and the channel ID, to obtain a feature value vector of the service type, a feature value vector of the net type, and a feature value vector of the channel ID; and generating the scenario representation vector according to the feature value vector of the service type, the feature value vector of the net type, and the feature value vector of the channel ID.

For example, assuming that the service type is "article", the net type is "Wi-Fi", and the channel ID is "1", the service type, the net type, and the channel ID may respectively be mapped into an embedding vector with the same dimension. If each of the service type, the net type, and the channel ID is represented by using a four-dimensional (not limited thereto) vector, three four-dimensional vectors (a1, a2, a3, a4), (b1, b2, b3, b4), and (c1, c2, c3, c4) are aggregated, to generate a new four-dimensional vector (d1, d2, d3, d4) as the scenario representation vector. Aggregation herein may be performing operations such as average pooling or max pooling on the three four-dimensional vectors. Taking average pooling as an example, a vector averaging operation is performed on the three four-dimensional vectors, that is, d1=(a1+b1+c1)/3, d2=(a2+b2+c2)/3, d3=(a3+b3+c3)/3, and d4=(a4+b4+c4)/3. Average pooling facilitates complete transfer of information and can control overfitting and improve model performance while reducing parameters and saving computational resources.

Step S330: Obtain a first weight of the first service embedding vector and a second weight of the second service embedding vector according to the scenario representation vector, the first service embedding vector, and the second service embedding vector.

In an embodiment of the present disclosure, the scenario representation vector may be used to adjust weight information of features of different services.

For example, the first weight of the first service embedding vector $\alpha_1$:

$$\alpha_1 = \frac{\exp(A^T f_1)}{\sum_{j=1}^{2} A^T f_j}, \quad (1)$$

where A represents the scenario representation vector, $f_1$ represents the first service embedding vector, and $f_2$ represents the second service embedding vector. T represents transposition of a matrix.

Similarly, the second weight of the second service embedding vector $\alpha_2$:

$$\alpha_2 = \frac{\exp(A^T f_2)}{\sum_{j=1}^{2} A^T f_j}. \quad (2)$$

Step S340: Generate a first service feature vector according to the first service embedding vector and the first weight of the first service embedding vector, and generate a second service feature vector according to the second service embedding vector and the second weight of the second service embedding vector.

For example, the first service feature vector $g_1$:

$$g_1 = \alpha_1 \times f_1 \quad (3).$$

For example, the second service feature vector $g_2$:

$$g_2 = \alpha_2 \times f_2 \quad (4).$$

Step S350: Obtain an object embedding vector according to the first service feature vector and the second service feature vector.

In an embodiment of the present disclosure, for features of different services, interconnection, namely correlation, between different features, for example, mutual influence between tags of a short video and a short video that are watched by the user, may be automatically learned in a self-attention manner, to generate the object embedding vector. In this way, in one aspect, the learning of the weight information of features of different services in different service scenarios can focus on a service matching the service scenario that the user is currently in and improve the accuracy of matched data. In another aspect, the effective learning of the correlation between the features of different services using the self-attention between the features can effectively use different service information to assist with personalized recommendation of a currently to-be-recommended single service, thereby further improving the accuracy of a matched item. In addition, if the currently to-be-recommended service is a new service such as a short video, other mature service information may be used to assist with personalized recommendation of the new service, thereby facilitating cold start of the new service.

Step S360: Obtain a plurality of first service candidate items.

For example, assuming that the first service is an article, the setting of some rules (for example, whether the layout is beautiful) may be implemented, to extract some quality articles and put same into an article candidate pool. When the service type is "article", articles in the article candidate pool are used as candidate items.

Step S370: Determine a first service target item from the plurality of first service candidate items according to the object embedding vector.

Figure 11:
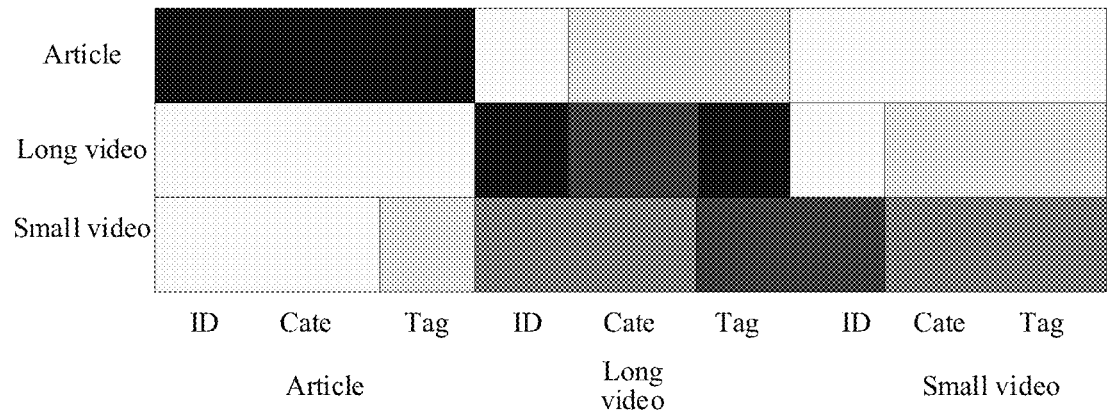
FIG. 11 is a heat map of weights of different service features in different service scenarios according to an embodiment of the present disclosure.

For the specific process of determining the first service target item, reference may be made to the description of FIG. 11.

In the data processing method provided in the implementations of the present disclosure, in one aspect, a first service embedding vector is generated according to the first service behavior feature, a second service embedding vector is generated according to the second service behavior feature, and a scenario representation vector is generated according to the service scenario feature. In addition, a first weight of the first service embedding vector and a second weight of the second service embedding vector are obtained according to the scenario representation vector, the first service embedding vector, and the second service embedding vector. Therefore, a first service feature vector may be generated according to the first service embedding vector and the first weight of the first service embedding vector, and a second service feature vector may be generated according to the second service embedding vector and the second weight of the second service embedding vector. That is, importance of behavior features of different services can be adjusted according to a service scenario that an object is currently in. In another aspect, an object embedding vector is additionally obtained according to the first service feature vector and the second service feature vector, which can effectively merge various service information, thereby effectively using related services to assist with item matching of a currently to-be-recommended service. Therefore, by comprehensively considering the service scenario that the object is currently in and assistance information from other services for the currently to-be-recommended service, the accuracy of a matched item can be improved, thereby helping to improve the accuracy of a personalized recommendation result in the end.

Figure 3:
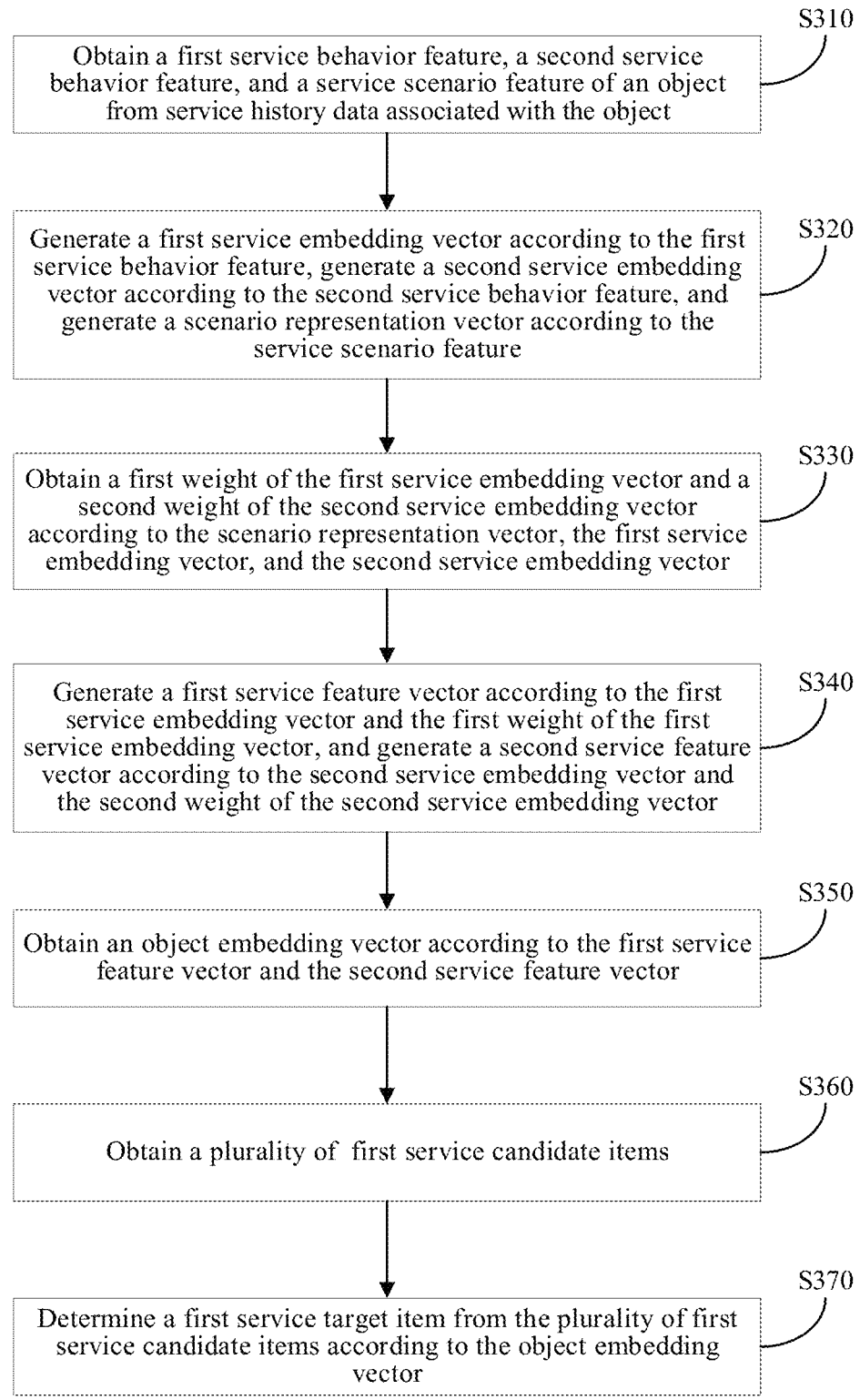
FIG. 3 is a flowchart of a data processing method according to an embodiment of the present disclosure.

FIG. 4 is a schematic diagram of a processing process of step S320 shown in FIG. 3 in an embodiment.

As shown in FIG. 4, in an embodiment of the present disclosure, the foregoing step S320 may further include the following steps:

Step S321: Vectorize a feature value in the first service behavior feature, to obtain a feature value vector in the first service behavior feature.

For example, each feature value (a feature value is an element) in the first service behavior feature may be vectorized. It is assumed herein that each feature value is represented by a four-dimensional vector, to obtain each feature value vector of the first service behavior feature.

Step S322: Generate a first service representation vector according to the feature value vector in the first service behavior feature.

In an embodiment of the present disclosure, all feature value vectors in the first service behavior feature may be aggregated. For example, an average pooling operation is performed on all the characteristic value vectors in the first service behavior feature, to obtain an average vector of all the characteristic value vectors as the first service representation vector.

Step S323: Perform spatial mapping on the first service representation vector, to generate the first service embedding vector.

For example, the first service embedding vector $f_1$:

$$f_1 = x_1 W_1 + b_1 \qquad (5).$$

In the foregoing formula, $W_1$ is a first space matrix, and $b_1$ is a first bias matrix, which may both be determined in a model training stage.

In another embodiment, the foregoing step S320 may further include: vectorizing a feature value in the second service behavior feature, to obtain a feature value vector in the second service behavior feature; generating a second service representation vector according to the feature value vector in the second service behavior feature; and performing spatial mapping on the second service representation vector, to generate the second service embedding vector.

For example, each feature value in the second service behavior feature may be vectorized. It is assumed herein that each feature value is represented by a four-dimensional vector, to obtain each feature value vector of the second service behavior feature. All feature value vectors in the second service behavior feature may be aggregated. For example, an average pooling operation is performed on all the feature value vectors in the second service behavior feature, to obtain an average vector of all the feature value vectors as the second service representation vector $x_2$.

For example, the second service embedding vector $f_2$:

$$f_2 = x_2 W + b \qquad (6).$$

In an embodiment of the present disclosure, the performing of an average pooling operation on a plurality of feature value vectors in a service facilitates complete transfer of information and can control overfitting and improve model performance while reducing parameters and a computational amount.

Figure 5:
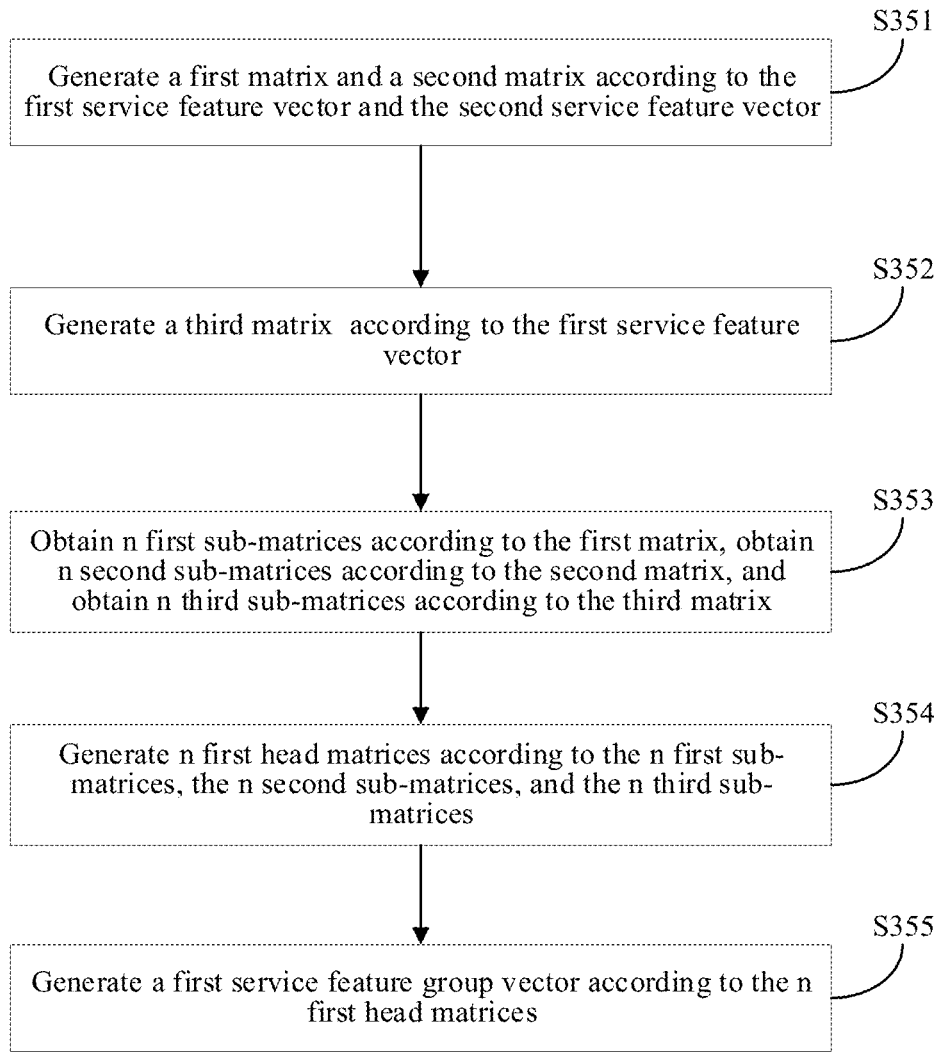
FIG. 5 is a schematic diagram of a processing process of step S350 shown in FIG. 3 in an embodiment.

FIG. 5 is a schematic diagram of a processing process of step S350 shown in FIG. 3 in an embodiment.

As shown in FIG. 5, in an embodiment of the present disclosure, the foregoing step S350 may further include the following steps:

Step S351: Generate a first matrix K and a second matrix V according to the first service feature vector $g_1$ and the second service feature vector $g_2$.

For example, the first matrix K may be obtained by using the following formula:

$$K = \langle g_1, g_2 \rangle W_2 + b_2 \qquad (7).$$

In the foregoing formula, $W_2$ is a second space matrix, and $b_2$ is a second bias matrix, which may both be determined in the model training stage.

For example, the second matrix V may be obtained by using the following formula:

$$V = \langle g_1, g_2 \rangle W_3 + b_3 \qquad (8).$$

In the foregoing formula, $W_3$ is a third space matrix, and $b_3$ is a third bias matrix, which may both be determined in the model training stage.

Step S352: Generate a third matrix $Q_1$ according to the first service feature vector.

For example, the third matrix $Q_1$:

$$Q_1 = g_1 W_4 + b_4 \qquad (9).$$

In the foregoing formula, $W_4$ is a fourth space matrix, and $b_4$ is a fourth bias matrix, which may both be determined in the model training stage.

Step S353: Obtain n first sub-matrices according to the first matrix, obtain n second sub-matrices according to the second matrix, and obtain n third sub-matrices according to the third matrix, where n is a positive integer greater than 1.

For example, n=8. Assuming that the first matrix K, the second matrix V, and the third matrix $Q_1$ are all 9*64-dimensional matrices, the first matrix K may be divided into eight 9*8-dimensional first sub-matrices, the second matrix V may be divided into eight 9*8-dimensional second sub-matrices, and the third matrix $Q_1$ may be divided into eight 9*8-dimensional third sub-matrices. The value of n may be set according to the practical situation, and is not limited to the example herein.

Step S354: Generate n first head matrices according to the n first sub-matrices, the n second sub-matrices, and the n third sub-matrices.

If the first service feature vector $g_1$ and the second service feature vector $g_2$ are modeled based on self-attention, the two features may be re-encoded according to the following formula:

$$\text{Attention}(Q_1, K, V) = \text{softmax}\left(\frac{Q_1 K^T}{\sqrt{d_k}}\right) V, \qquad (10)$$

where softmax is an activation function. Assuming that $Q_1$ is a $k*d_k$-dimensional matrix, K is a $d_k*m$-dimensional matrix, V is an $m*d_v$-dimensional matrix, and k, $d_k$, m, and $d_v$ are all positive integers greater than or equal to 1, if the impact of softmax is neglected, an attention layer is obtained, and a $k*d_k$ sequence of $Q_1$ is encoded into a new $k*d_v$ sequence. $\sqrt{d_k}$ plays a regulating role, which keeps an inner product from becoming excessively large. Otherwise, a result obtained after softmax is either 0 or 1.

In an embodiment of the present disclosure, a multi-head self-attention mechanism is used, where each head may be represented as:

$$head_{1i}=Attention(Q_{1i},W_{iS}^{Q1i},K_iW_{iS}^{Ki},V_iW_{iS}^{Vi}) \quad (11).$$

In the foregoing formula, i is a positive integer greater than or equal to 1 and less than or equal to n. $head_{1i}$ represents an $i^{th}$ first head matrix, $Q_{1i}$ represents an $i^{th}$ first sub-matrix, $K_i$ represents an $i^{th}$ second sub-matrix, and $V_i$ represents an $i^{th}$ third sub-matrix. $W_{iS}$ is an $i^{th}$ fifth space matrix, which may be determined in the model training stage.

Step S355: Generate a first service feature group vector according to the n first head matrices.

Figure 6:
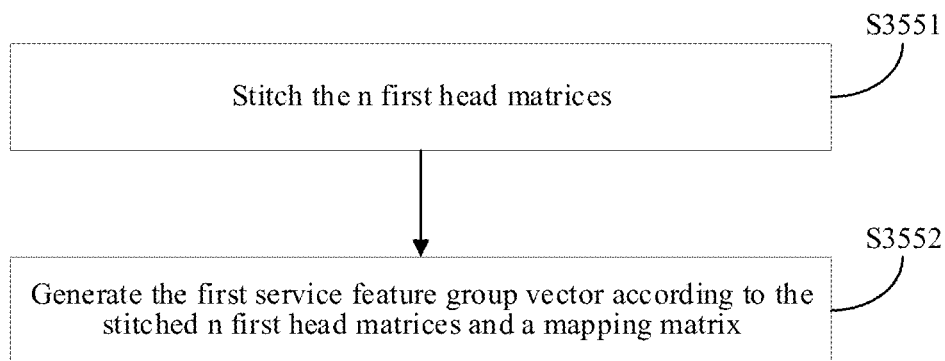
FIG. 6 is a schematic diagram of a processing process of step S355 shown in FIG. 5 in an embodiment.

For a process of generating the first service feature group vector, reference may be made to the embodiment shown in FIG. 6. As shown in FIG. 6, in an embodiment of the present disclosure, the foregoing step S355 may further include the following steps:

Step S3551: Stitch the n first head matrices.

Step S3552: Generate the first service feature group vector according to the stitched n first head matrices and a mapping matrix.

For example, the following formula may be used to calculate the first service feature group vector $group_1$:

$$group_1=[head_{11},head_{12},head_{13},\ldots,head_{1n}]W^o \quad (12)$$

In the foregoing formula, $W^o$ represents the mapping matrix.

Figure 7:
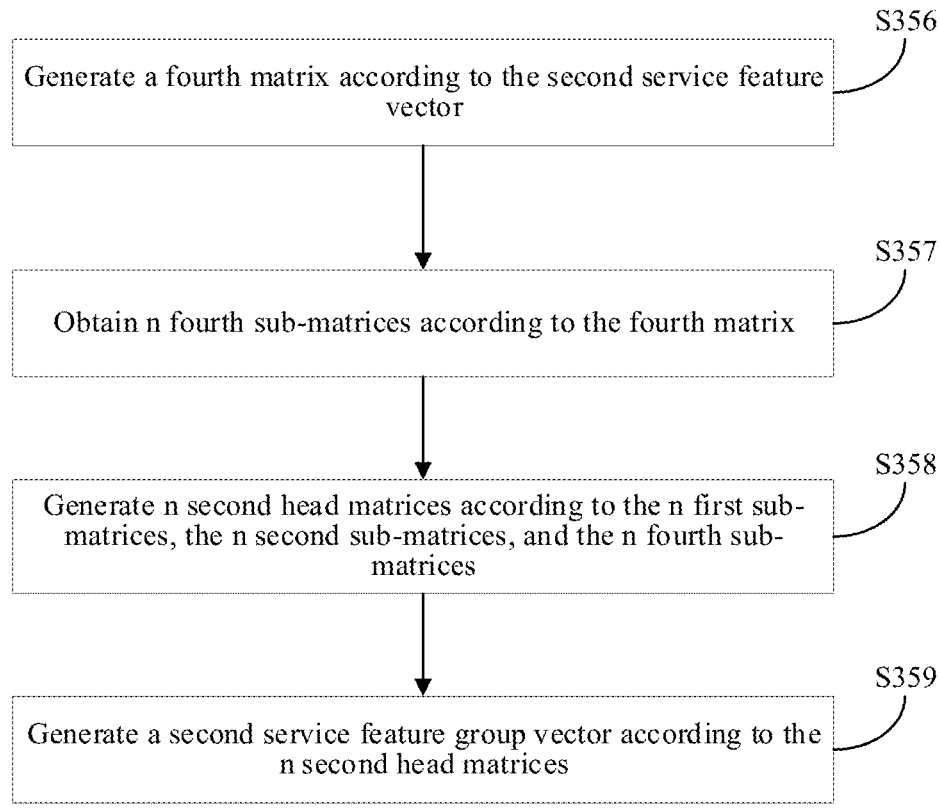
FIG. 7 is a schematic diagram of a processing process of step S350 shown in FIG. 3 in another embodiment.

FIG. 7 is a schematic diagram of a processing process of step S350 shown in FIG. 3 in another embodiment.

As shown in FIG. 7, in an embodiment of the present disclosure, the foregoing step S350 may further include the following steps:

Step S356: Generate a fourth matrix according to the second service feature vector.

For example, the fourth matrix $Q_2$:

$$Q_2=g_2W_6+b_6 \quad (13).$$

In the foregoing formula, $W_6$ is a sixth space matrix, and $b_6$ is a sixth bias matrix, which may both be determined in the model training stage.

Step S357: Obtain n fourth sub-matrices according to the fourth matrix.

For example, n=8. Assuming that the fourth matrix $Q_2$ is a 9*64-dimensional matrix, the fourth matrix $Q_2$ may be divided into eight 9*8-dimensional fourth sub-matrices.

Step S358: Generate n second head matrices according to the n first sub-matrices, the n second sub-matrices, and the n fourth sub-matrices.

If the first service feature vector $g_1$ and the second service feature vector $g_2$ are modeled based on self-attention, the two features may be re-encoded according to the following formula:

$$Attention(Q_2, K, V) = softmax(\frac{Q_2K^T}{\sqrt{d_k}})V, \quad (14)$$

where it is assumed that $Q_2$ is a $k*d_k$-dimensional matrix.

In an embodiment of the present disclosure, a multi-head self-attention mechanism is used. Each head may be represented as:

$$head_{2i}=Attention(Q_{2i},W_{i7}^{Q2i},K_iW_{i7}^{Ki},V_iW_{i7}^{Vi}) \quad (15).$$

In the foregoing formula, $head_{2i}$ represents an $i^{th}$ second head matrix, and $Q_{2i}$ represents an $i^{th}$ fourth sub-matrix. $W_{i7}$ is an $i^{th}$ seventh space matrix, which may be determined in the model training stage.

Step S359: Generate a second service feature group vector according to the n second head matrices.

For example, the following formula may be used to calculate the second service feature group vector $group_2$:

$$group_2=[head_{21},head_{22},head_{23},\ldots,head_{2n}]W^o \quad (16).$$

Figure 8:
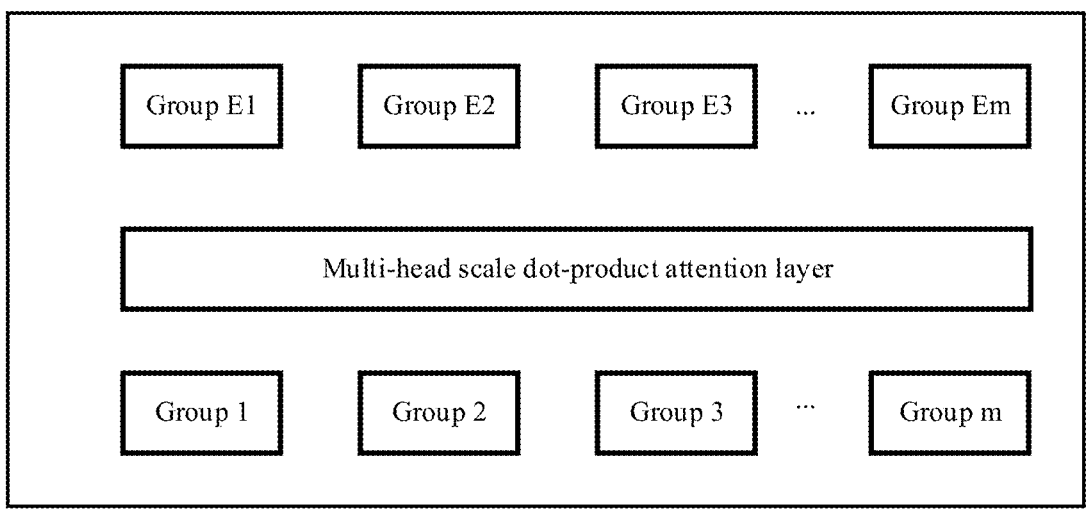
FIG. 8 is a schematic diagram of a group attention mechanism according to an embodiment of the present disclosure.

FIG. 8 is a schematic diagram of a group attention mechanism according to an embodiment of the present disclosure.

As shown in FIG. 8, group refers to that behavior features of the user are divided into different feature groups. For example, in the foregoing example, m=2, a group E1 corresponds to the first service feature vector $g_1$, a group E2 corresponds to the second service feature vector $g_2$, a group 1 and a group 2 are generated after a multi-head scale dot-product self-attention layer, that is, the first service feature group vector $group_1$ and the second service feature group vector $group_2$.

In an embodiment of the present disclosure, after the foregoing self-attention layer, the service feature group vector of each group is merged with global information of all groups.

Figure 9:
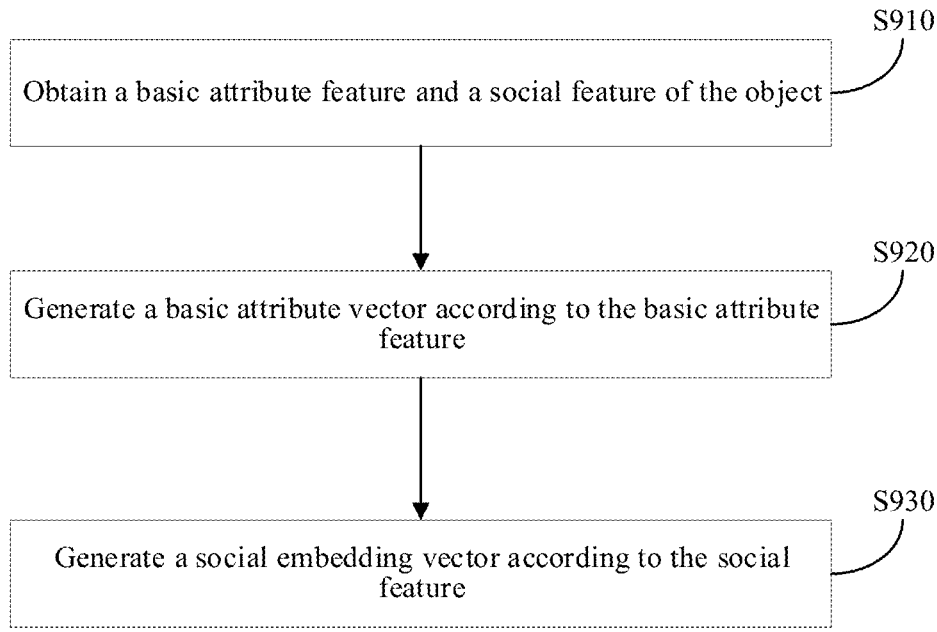
FIG. 9 is a flowchart of a data processing method according to another embodiment of the present disclosure.

FIG. 9 is a flowchart of a data processing method according to another embodiment of the present disclosure.

As shown in FIG. 9, a difference from the foregoing embodiment is that the method provided in this embodiment of the present disclosure may further include the following steps:

Step S910: Obtain a basic attribute feature and a social feature of the object.

The basic attribute feature of the user may include, for example, gender, age, a current location. The social feature may include, for example, information of the user's friends, information of moments posted by the user, information of interaction between the user and the user's friends, or the like.

Step S920: Generate a basic attribute vector according to the basic attribute feature.

For example, taking the gender, age, current location of the user as an example, the three features are represented using a vector of the same dimension such as a four-dimensional vector first, and an average pooling operation is performed on the three four-dimensional vectors. That is, the vectors are averaged to obtain a new four-dimensional vector as the basic attribute vector of the user.

Step S930: Generate a social embedding vector according to the social feature.

A social relationship graph or a social network may be constructed according to the social feature of the user. A node in the social relationship graph represents a user, and two users having a social relationship such as friendship, colleague relationship, kinship, or the like are connected by a line. The social relationship graph is inputted into a graph embedding model such as Node2vec (node to vector), DeepWalk and LINE (large-scale information Network). The graph embedding model can automatically output the social embedding vector of the user.

Figure 10:
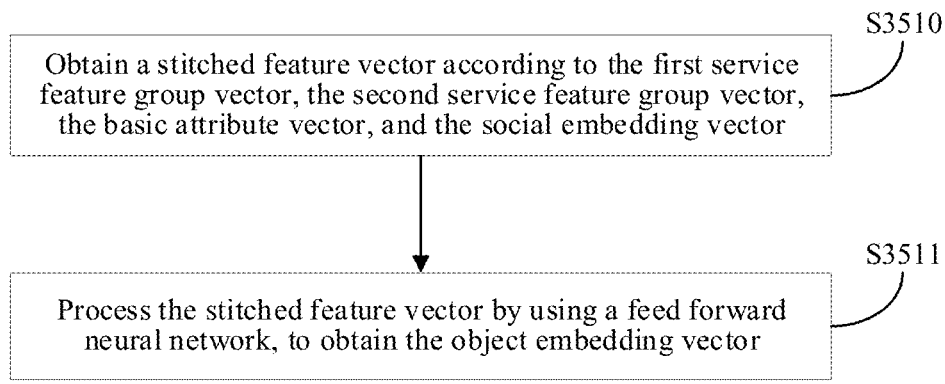
FIG. 10 is a schematic diagram of a processing process of step S350 shown in FIG. 3 in still another embodiment.

FIG. 10 is a schematic diagram of a processing process of step S350 shown in FIG. 3 in still another embodiment.

As shown in FIG. 10, in an embodiment of the present disclosure, the foregoing step S350 may further include the following steps:

Step S3510: Obtain a stitched feature vector according to the first service feature group vector, the second service feature group vector, the basic attribute vector, and the social embedding vector.

The first service feature group vector, the second service feature group vector, the basic attribute vector, and the social embedding vector are stitched in sequence, to form a stitched feature vector of a larger dimension. In this way, various service behavior features and the basic attribute feature and the social feature of the user are simultaneously merged.

Step S3511: Process the stitched feature vector by using a feed forward neural network (FNN), to obtain the object embedding vector.

In the embodiments of the present disclosure, a context-aware multi-service fusion model is designed, which can merge various service behavior features (that is, multi-service fusion), can adjust weight distribution of different service behavior features according to service scenario features (that is, context awareness), and can use an FNN for processing to generate the object embedding vector, such as a user embedding vector. During modeling, a social attribute may also be introduced, to help provide some matched candidate items from the perspective of the social relationship of the user.

An FNN, or referred to as a feed forward network, is a type of artificial neural network. An FNN has a unidirectional multilayer structure. Each layer includes a plurality of neurons. In this neural network, each neuron can receive signals from neurons of a previous layer, and generate output to a next layer. The $0^{th}$ layer is an input layer, the last layer is an output layer, and other middle layers are hidden layers. There may be one or more hidden layers. There is no feedback in the entire network, and the signals are propagated unidirectionally from the input layer to the output layer.

A specific example is provided below for description of the method provided in the foregoing embodiments.

Assuming that a user U1 has clicked articles A1, A2, and A3 recently, that is, an article reading sequence is [A1, A2, A3], a next article A4 that the user U1 may read is to be predicted herein. In addition, a video play sequence [B1, B2, B3] of videos and a short video play sequence [C1, C2, C3] of short videos that are recently watched by the user are also collected. These may be referred to as short-term behaviors in user short-term interests. Specific examples of features are shown in Table 1 below. For articles read or videos watched recently by the user, "recently" herein is not specifically limited to the last week.

TABLE 1

| Basic attributes of a user | Male, 34, Beijing |
|---|---|
| Article reading sequence | A1, A2, A3 |
| Tags in historically read articles | ATag1, ATag2, ATag3, ATag4 |
| Categories to which historically read articles belong | ACate1, ACate2, ACate3 |
| Video play sequence | B1, B2, B3 |
| Tags in historically played videos | BTag1, BTagB2, BTag3, BTag4 |
| Categories to which historically played videos belong | BCate1, BCate2, BCate3 |
| Small video play sequence | C1, C2, C3 |
| Tags in historically played short videos | CTag1, CTagB2, CTag3, CTag4 |
| Categories to which historically played short videos belong | CCate1, CCate2, CCate3 |
| Service type | Article |
| Channel ID | 1 |
| Net type | Wi-Fi |

Each element of each feature in the foregoing Table 1 is mapped into an embedding vector (that is, a feature value vector) by using the model provided in the embodiments of the present disclosure. Each row in Table 1 may be referred to as a feature group, and each feature group is referred to as a field group for short. There are a plurality of elements in some feature groups, while there is only one element in some feature groups.

Features of the service type, the channel ID, and the net type are context scenario-related features. A scenario representation vector is generated from the three features via a network. It is assumed that ContextEmbed is used to represent the scenario representation vector.

Other features are divided into two parts. One part is basic attribute features of the user, and the other part is short-term service behavior features of the user. The part of basic attribute features of the user is directly aggregated. For example, average pooling is directly performed to generate a basic attribute vector of the user.

The short-term service behavior features of the user include a total of nine feature groups. The nine feature groups are first aggregated, to generate nine feature representation vectors (that is, each service representation vector is represented by three feature representation vectors, for example, a first service representation vector includes a first feature representation vector of the article reading sequence, a second feature representation vector of the tags in historically read articles, and a third feature representation vector of the categories to which historically read articles belong). Average pooling may be used for aggregation. Vector averaging is performed on vectors of elements in the same feature group, to generate a new vector as a feature representation vector of the corresponding feature group. In this way, though quantities of elements included in the same feature group of different users may differ greatly, each feature group may be eventually expressed by a vector of the same dimension after the vector averaging.

Spatial mapping is then performed on the nine feature representation vectors, to map different features into the same feature space, which is specifically a matrix multiplication and reference may be made to the foregoing Formulas (5) and (6). In this case, $x_j$ in the formulas represents a $j^{th}$ feature representation vector, and j is a positive integer greater than or equal to 1 and less than or equal to 9. After mapping, nine feature embedding vectors are obtained and represented as Embeds 1-9.

Then, ContextEmbed is used to re-adjust weights of the nine feature groups in short-term services. Specifically, attention may be used. Referring to the foregoing Formulas (1) to (4), calculation may be performed according to the following formulas:

$$\alpha_j = \frac{\exp(A^T f_j)}{\sum_{j=1}^{n_f} A^T f_j}, \text{ and} \tag{17}$$

$$NemEmbed_j = \alpha_j Embed_j. \tag{18}$$

In the foregoing formulas, $\alpha_j$ represents a weight of a $j^{th}$ feature embedding vector, and $n_f$ represents the quantity of feature groups related to short-term service behaviors. $n_f$ is a positive integer greater than or equal to 1, and j is a positive integer greater than or equal to 1 and less than or equal to $n_f$, for example, $n_f$=9. $Embed_j$ represents the $j^{th}$ feature embedding vector, $NemEmbed_j$ represents a $j^{th}$ service feature vector, and A represents ContextEmbed.

The foregoing Formula (17) is used for calculation to obtain weight distribution of each feature group in a current service scenario. Formula (18) is then used to multiply weight values respectively by the corresponding feature embedding vectors of the feature groups. Service feature vectors after weight adjustment by attention are represented as NewEmbeds 1-9.

In a practical scenario, different service features in different scenarios play different roles. In the embodiments of the present disclosure, by using the solution of contextual attention, re-distribution of the weights of different service features can be completed in different service scenarios. By statistic analysis of data, it is confirmed that the method provided in the embodiments of the present disclosure can complete weight re-adjustment of the service features according to the service scenarios. For a relatively mature service, related service scenario features play a leading role. For a cold start service, generalized features play an important role. In this case, weights of features of other related services are significantly increased, thereby assisting the cold start service in matching a recommendation result. FIG. 11 is a heat map of weights of different service features in different service scenarios.

As shown in FIG. 11, ID, Cate, and Tag of articles respectively represent an article reading sequence, categories to which historically read articles belong, and tags in the historically read articles. ID, Cate, and Tag of long videos respectively represent a video play sequence, categories to which historically played videos belong, and tags in the historically watched videos. ID, Cate, and Tag of short videos respectively represent a short video play sequence, categories to which historically watched short video belong, and tags in the historically watched short videos. In an article recommendation service, article-related feature groups play a key role. In a short video (cold start service) recommendation service, in addition to short video-related features, long video-related features also play an important role. It indicates that this modeling manner can learn service feature weight distributions in different service scenarios, and when applied to a cold start service, the modeling manner can adequately learn assistance information from other service features for the cold start service.

In addition, self-attention is used to model the newly-generated nine service feature vectors. The advantage of a self-attention layer lies in capturing global connection in one step and solving long-range dependency as the self-attention layer directly compares sequences two by two and allows parallel computation.

A multi-head scale dot-product self-attention layer is used to re-encode the nine feature groups related to the short-term service behaviors. A specific calculation method is as follows:

$$\text{Attention}(Q, K, V) = \text{softmax}\left(\frac{QK^T}{\sqrt{d_k}}\right)V. \qquad (19)$$

In the foregoing Formula (19), K and V are respectively generated by performing spatial mapping similar to that of Formula (5) on NewEmbeds 1-9, and are the same for obtaining $group_1$ to $group_9$ below. However, Q differs for each group in $group_1$ to $group_9$. During calculation of $group_1$ is calculated, Q is obtained by performing spatial mapping similar to that of Formula (5) on NewEmbed 1. During calculation of $group_2$ is calculated, Q is obtained by performing spatial mapping similar to that of Formula (5) on NewEmbed 9. Space matrices and bias matrices during spatial mapping are both obtained in a model training process.

In an embodiment of the present disclosure, a multi-head self-attention mechanism is used. Taking calculating $group_1$ as an example, each head may be represented as:

$$head_q = \text{Attention}(QW_q^Q, KW_q^K, VW_q^V) \qquad (20),$$

where q is a positive integer greater than or equal to 2 and less than or equal to n, and n is the quantity of sub-matrices into which each matrix in K, V, and Q is divided. For example, assuming that K, V, and Q are all 9*64-dimensional matrices, and K, V, and Q are respectively divided into eight 9*8-dimensional matrices, n=8, and q is a positive integer from 1 to 8. The corresponding heads are calculated according to the corresponding sub-matrices of K, V, and Q, and eight 9*8-dimensional heads are obtained: $head_1$, $head_2$, $head_3$, $head_4$, $head_5$, $head_6$, $head_7$, and $head_8$. The multi-head self-attention mechanism is the improvement of the attention mechanism. In the multi-head self-attention mechanism, attention is performed after Q, K, and V are mapped via a space matrix, this process is repeated for a plurality of times, and the results are then stitched. "Multi-head" indicates that the same operation is performed a plurality of times (parameters are not shared), results are stitched, and attention is performed inside a sequence, to find connection inside the sequence.

A service feature group vector of each feature group is represented as a stitching of a plurality of heads, and then multiplied by a mapping matrix $W^o$ to re-map the stitched vector into a multidimensional space.

$$group_j = [head_1, head_2, head_3, \ldots, head_n]W^o \qquad (21).$$

In the foregoing formula, $group_j$ indicates a service feature group vector of a $j^{th}$ feature group, where i is a positive integer greater than or equal to 1 and less than or equal to $n_f$, for example, $n_f$=9. For example, if n=8, $head_1$, $head_2$, $head_3$, ..., $head_8$ is stitched, to generate a new 9*64-dimensional matrix. For each group, $head_1$, $head_2$, $head_3$, ..., $head_n$ is different. Therefore, each group is different.

After the foregoing attention, the service feature group vector of each feature group is merged with global information of all groups.

Figure 12:
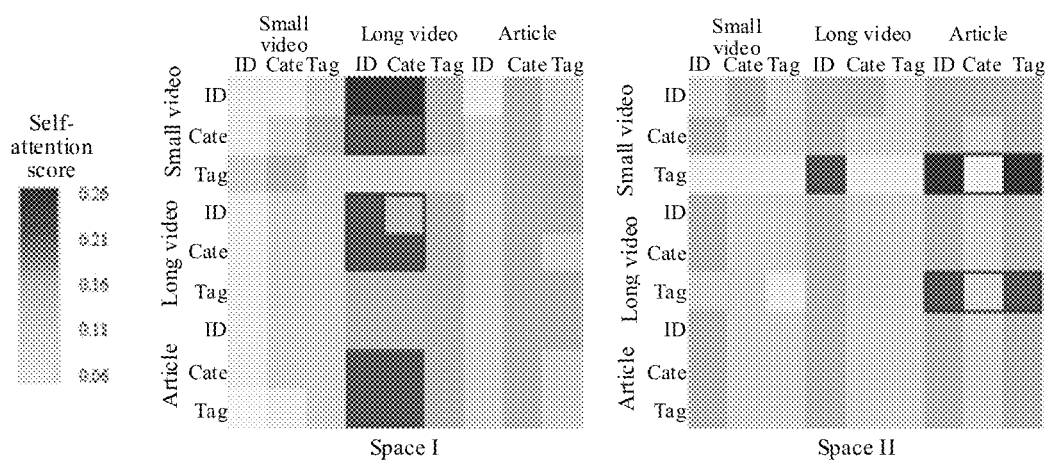
FIG. 12 is a heat map of an interaction feature inside a feature domain according to an embodiment of the present disclosure.

To ensure the effectiveness of a visible interaction attention mechanism, a multi-head self-attention heat map of a user from a short video channel among all feature domains is analyzed. Most heads focus on feature fields in a target short video channel. However, two heads shown in FIG. 12 separately obtain important information from another heterogeneous channel. In a heat map shown on the left of FIG. 12, when ID and Cate embeddings (embedding vectors) of short video and long video channels are constructed, multi-head attention amplifies ID and Cate features of the long video channel. However, in a heat map on the right, multi-head attention highlights tag and ID features of an article when constructing tag embeddings (embedding vectors) of the two video channels. The result indicates that the method provided in the embodiments of the present disclosure can effectively resolve interaction modes between feature domains with different heads. In addition, the effectiveness of separately considering each feature domain is confirmed, since each feature domain usually performs differently in feature interaction.

After the self-attention operation, newest service feature group vectors of the final nine feature groups are obtained. The service feature group vectors of the feature groups are stitched with a basic attribute vector of a basic attribute feature group of the user and a social embedding vector of the user, to obtain a long-dimension stitching feature vector. A final user embedding vector of the user is obtained via a multilayer FNN (for example, three fully connected layers and activation functions connected in sequence shown in FIG. 14, where the activation functions may be Tan h functions, that is, each fully connected layer is followed by a ReLU (rectified linear unit) activation function, but the present disclosure is not limited thereto) and it is assumed that the user embedding vector is Eu.

Figure 13:
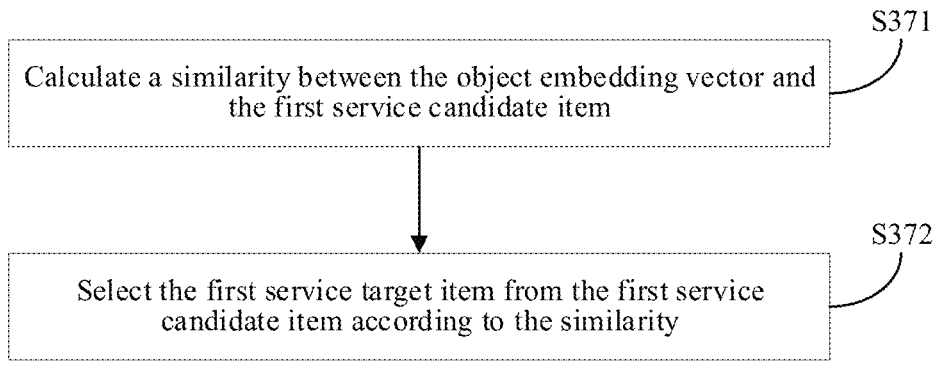
FIG. 13 is a schematic diagram of a processing process of step S370 shown in FIG. 3 in an embodiment.

FIG. 13 is a schematic diagram of a processing process of step S370 shown in FIG. 3 in an embodiment.

As shown in FIG. 13, in an embodiment of the present disclosure, the foregoing step S370 may further include the following steps:

Step S371: Calculate a similarity between the object embedding vector and each of the plurality of first service candidate items.

Still taking the first service being an article as an example, the user embedding vector Eu in the foregoing embodiment may be used to predict an article to be recommended. If a quality article candidate pool include N articles [X1, X2, X3, ... XN] as candidate items, where N is a positive integer greater than or equal to 1, embedding vectors of each candidate item are respectively obtained, and similarities between the embedding vectors of each candidate item and the user embedding vector Eu are respectively calculated.

In an embodiment of the present disclosure, taking a cosine similarity as an example, the similarities between the candidate items and the user embedding vector Eu may be calculated according to the following formula:

$$\text{Cos}(u, v) = \frac{\sum_{i=1}^{M} u_i \times v_i}{\sqrt{\sum_{i=1}^{M} u_i^2} \sqrt{\sum_{i=1}^{M} v_i^2}}. \quad (22)$$

In the foregoing formula, u and v are both M-dimensional vectors, M is a positive integer greater than or equal to 1, u may be used to represent the user embedding vector Eu, v may be used to represent the embedding vector of any candidate item, $u_i$ indicates an $i^{th}$ feature value in u, and $v_i$ indicates an $i^{th}$ feature value in v.

The calculation manner of the similarities is not limited to the cosine similarity used as an example above, and other calculation manner also fall within the protection scope of the present disclosure.

Step S372: Select the first service target item from the plurality of first service candidate items according to the similarity.

According to the similarities between the candidate items and the user embedding vector, the candidate items may be ranked in descending order, and the top K candidate items are selected as matched first service target items. Then, the matched first service target items are returned to an upper layer application, such as a ranking module in a recommendation system.

For example, for the user U1 in the foregoing Table 1, short-term article reading behavior features, video play behavior features, short video play behavior features of the user U1 are effectively merged with a user profile (including basic attribute features and social features of the user), and encoded into the user embedding vector Eu, and cosine similarity scores of the user embedding vector Eu and the candidate items are calculated. Assuming that there are 10 articles in the quality article candidate pool, and candidate items most similar to the user embedding vector Eu obtained after calculation are X3, X5, and X7. X3, X5, and X7 are used as matched candidate items. So far, the system has completed candidate item matching for the user U1.

Figure 14:
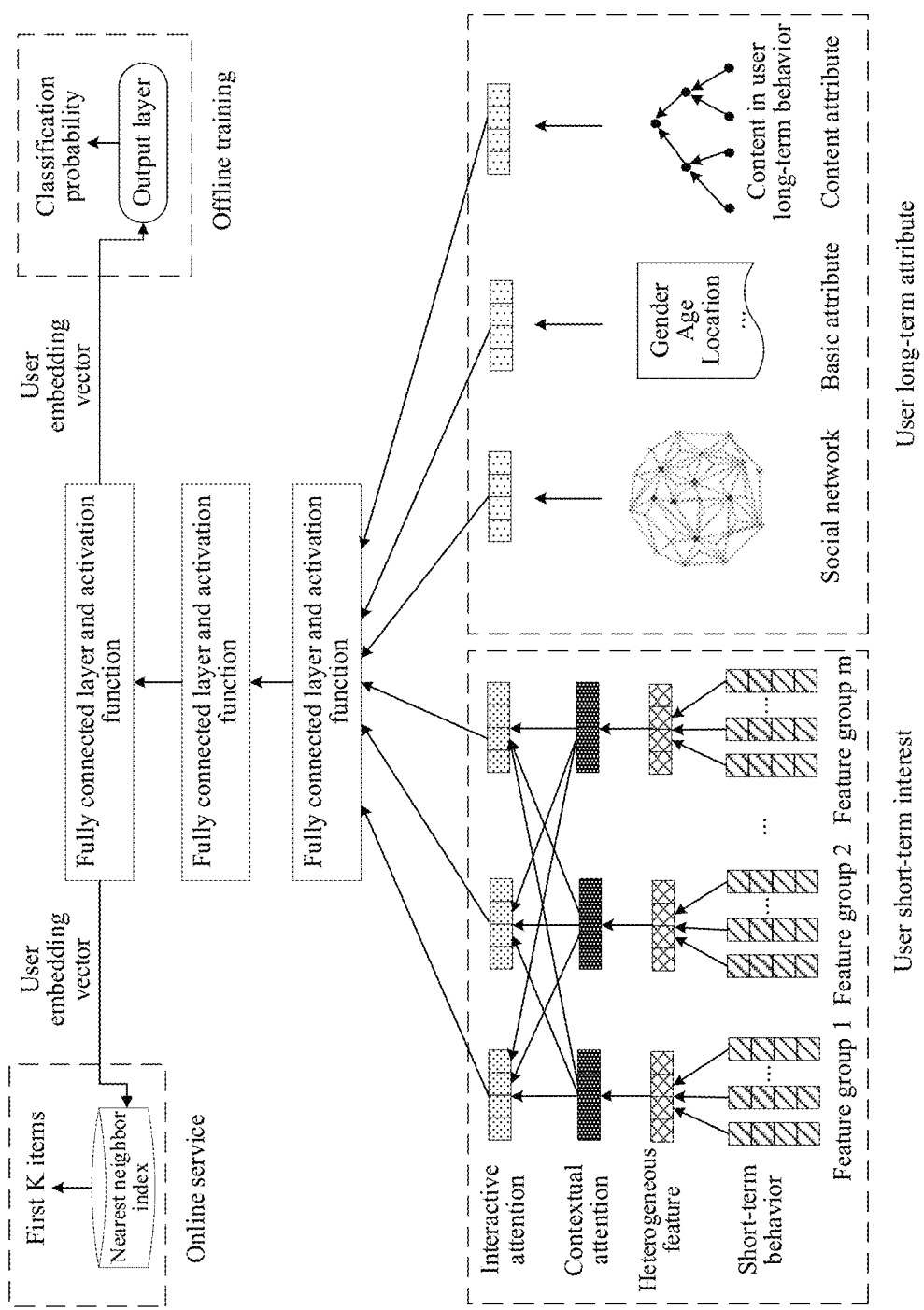
FIG. 14 is a schematic diagram of a network structure of a matching framework according to an embodiment of the present disclosure.

FIG. 14 is a schematic diagram of a network structure of a matching framework according to an embodiment of the present disclosure.

As shown in FIG. 14, assuming that the user short-term interests include short-term behaviors of the user performed on a plurality of different services, the short-term behaviors of the user are divided into a feature group 1, a feature group 2, ..., and a feature group m, where m is a positive integer greater than or equal to 2. Feature values in each feature group are represented by an embedding vector of the same dimension (for example, four dimensions), and vector averaging is performed on feature value vectors of the feature groups, to obtain a new four-dimensional vector of each feature group as a service representation vector of each feature group. The service representation vectors of the feature groups are referred to as heterogeneous features, since each feature group expresses a different meaning, which may be different behavior feature information of the same service, such as an article reading sequence, tags in historically read articles, and categories to which the historically read article belong, or may be behavior feature information of different services, such as an article reading sequence and a video play sequence. The scenario representation vectors are used to adjust weights of the service representation vectors of different feature groups, to generate the service feature vectors of the feature groups, that is, context-aware service scenario information based on the attention mechanism (contextual attention). Next, the self-attention mechanism is used to merge the service feature vectors of feature groups, to obtain service feature group vectors of each feature group. The service feature group vectors of each feature group are merged with service feature information of all feature groups, that is "interactive attention".

Further referring to FIG. 14, in addition to user short-term interests, user long-term profiles may also be collected, such as the social network, the basic attributes, and content attributes of the user. The content attributes are contents in user long-term behaviors, and is a concept relative to user short-term behaviors. The user short-term behaviors may include, for example, articles recently read, videos recently watched, and short videos recently played by the user. The user long-term behaviors include all historically read articles, all historically played videos, all historically played short videos, or the like by the user for a historically long time, for example, from signup or login of the user on an APP. Long-term behavior features such as all article reading sequences, all tags in historically read articles, all categories to which the historically read articles belong, all video play sequences, all tags in historically played videos, all categories to which the historically played videos belong, all short video play sequences, all tags in historically played short videos, all categories to which the historically played short videos belong of the user in history may be extracted from these long-term behaviors. These long-term behavior features are represented as embedding vectors. The embedding vectors of the long-term behavior features are processed using a neural network, so that long-term behavior feature vectors may be obtained.

In an embodiment of FIG. 14, the service feature group vectors of each feature group representing user short-term interests, the social embedding vectors representing user long-term profiles, basic attribute vectors, and long-term behavior feature vectors may be stitched. A stitched vector is inputted into a multilayer FNN. Three groups of fully connected layer and activation function connected in sequence are used as an example herein for description, but the present disclosure is not limited thereto. The specific structure of each layer in the FNN and a total quantity of included layers may be set according to actual needs. The last group of fully connected layer and activation function of the FNN are used to output the user embedding vector.

FIG. 14 may be divided into two stages. The first stage is offline model training, and the second stage is providing online services by using a trained model. In the stage of offline model training, a training data set is first obtained. The training data set includes user short-term interests, long-term profiles, and tags of the user. The tags of the user may be determined according to whether the user has read an article or played a video or short video historically. For example, if the user has read an article historically, the user is used as a positive sample in the training data set. If the user has not read an article historically, the user is used as a negative sample in the training data set. The short-term interests and long-term profiles of the user in the training data set are inputted into a model, to obtain the user embedding vector. The user embedding vector is inputted to an output layer of the model, to output classification probabilities. A classification result with the highest probability is selected from the classification probabilities as a prediction result. The prediction result is compared with the tags of the user, an error function is calculated, and parameters of the model are optimized through gradient backhaul. This process is iteratively executed until a stopping condition is met, for example, a set number of iterations is reached, or an error is less than a set value. At this point, the model training is complete.

In the online service stage, the currently to-be-predicted short-term interests and long-term profiles of the user are inputted into the foregoing trained model to obtain the user embedding vector. The similarities between the user embedding vector and the candidate items are calculated, and first K items with largest similarities are selected as matched items, which is nearest neighbor index. That is, a database is searched according to a similarity of data for an item most similar to target data (such as the user embedding vector herein). This similarity is usually quantified into a distance between data in space. A shorter distance between data in space indicates a higher similarity between the data.

The short-term interests may be used to collect user behavior feedback in real time, and may be selected and added to training samples. Short-term service behavior features are extracted in real time, and the model is updated nearly in real time. In this way, latest interests of the user may be reflected nearly in real time in recommendation results.

For the offline part, the offline training data is sorted by storing and cleaning up long-term behavior data of online users, and the model is updated periodically. For ultra-large-scale data and machine learning-based models, an efficient distributed machine learning platform is used to support offline training.

Figure 15:
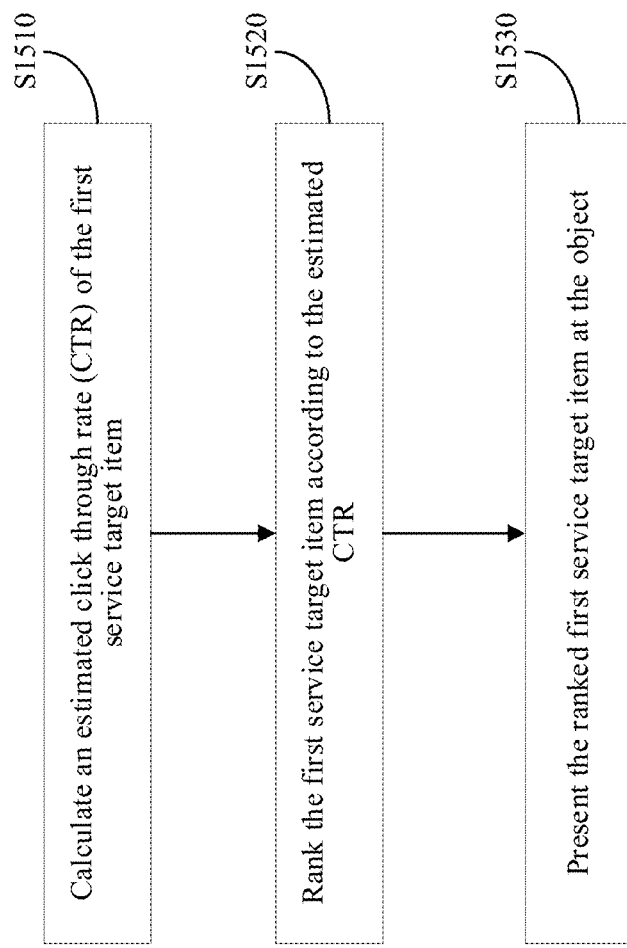
FIG. 15 is a flowchart of a data processing method according to still another embodiment of the present disclosure.

FIG. 15 is a flowchart of a data processing method according to still another embodiment of the present disclosure.

As shown in FIG. 15, a difference from the foregoing embodiment is that the method provided in this embodiment of the present disclosure may further include the following steps:

Step S1510: Calculate an estimated click through rate (CTR) of the first service target item.

In an embodiment of the present disclosure, the ranking module in the recommendation system may be used to calculate CTRs of matched items.

Step S1520: Rank the first service target item according to the estimated CTR.

The matched items are ranked in descending order according to the CTRs of the matched items, but the present disclosure is not limited thereto. For example, the matched items may be alternatively ranked in ascending order.

Step S1530: Present the ranked first service target item at the object.

The ranked matched items are returned to a terminal device corresponding to the user in sequence, and displayed on a display screen of the terminal device, for example, displayed in an information flow interface of an instant messaging APP of the user.

Figure 16:
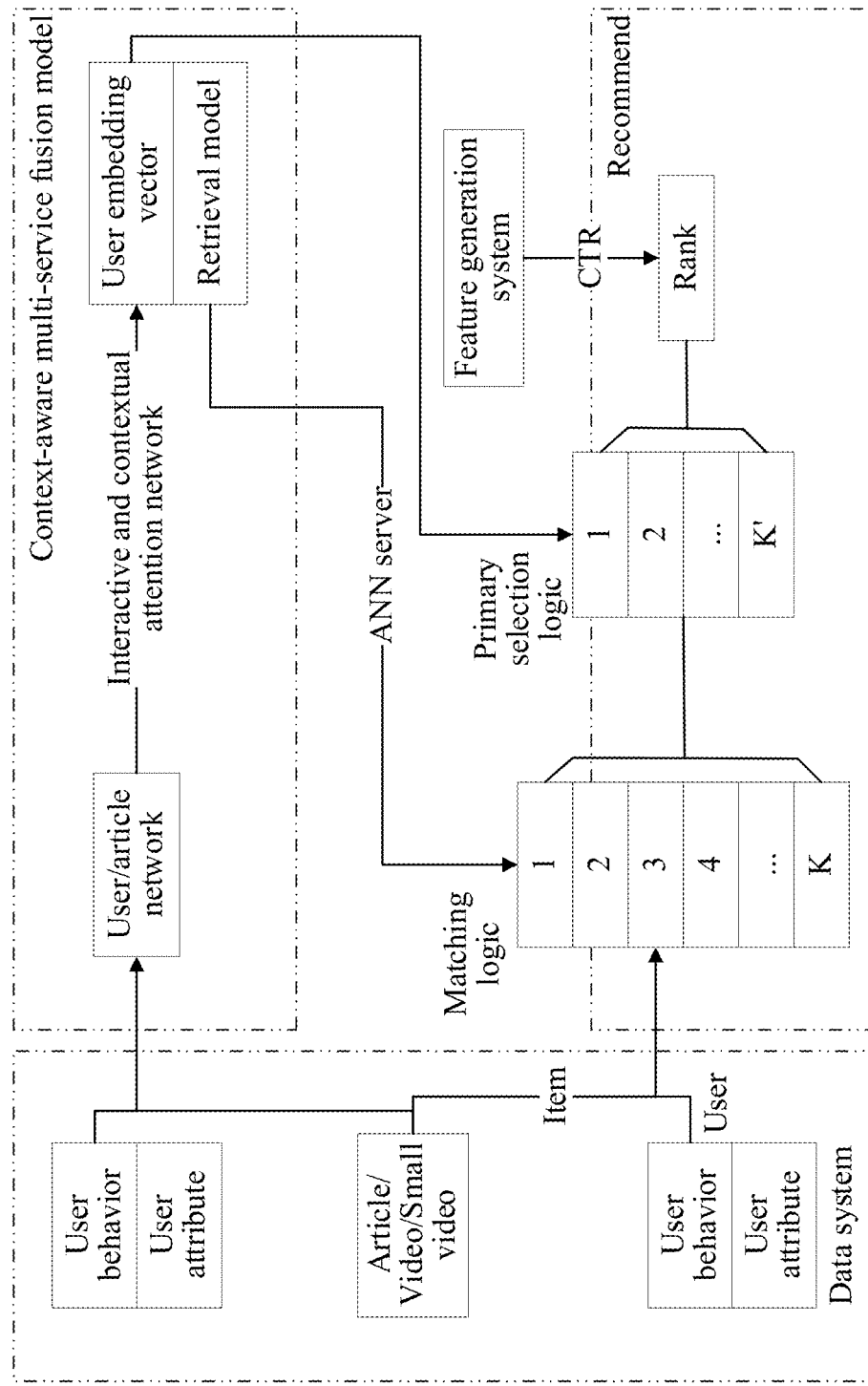
FIG. 16 is a schematic diagram of a matching model applied to a recommendation system according to an embodiment of the present disclosure.

FIG. 16 is a schematic diagram of a matching model applied to a recommendation system according to an embodiment of the present disclosure.

As shown in FIG. 16, a matching model provided in the embodiments of the present disclosure (the model shown in FIG. 14 above is referred to as a context-aware multi-service fusion model) is applied to an information flow recommendation system on an instant messaging APP, which may include a user/article network, an interactive and contextual attention network, and a retrieval model. The network is referred to as a user/article network on the assumption that a next article that the user is interested in is to be predicted. If a to-be-detected service type changes, a corresponding network name may change, such as a user/video network, a user/short video network.

Short-term service behavior features, basic attribute features, and social features of the user may be acquired from user behaviors and user profiles stored in a data system, and candidate items may also be extracted from items of different services such as articles/videos/short videos stored in the data system. For example, assuming that the candidate items are candidate articles, the short-term service behavior features, basic attribute features, and social features of the user and the candidate articles are inputted into the user/article network to generate the service embedding vectors of each feature group and the embedding vectors of the candidate articles. Then, the service embedding vectors of each feature group are inputted into the interactive and contextual attention network to generate the service feature group vectors of each feature group. Based on the service feature group vectors of each feature group, the user embedding vectors may be generated. Reference may be made to the descriptions of the foregoing embodiments for the specific process.

The retrieval model is configured to determine the matched candidate items according to the user embedding vectors and the embedding vectors of the candidate items. In an embodiment of FIG. 14, the K items with the highest similarities are found from the candidate items based on nearest neighbor search as the matched candidate items. Since the nearest neighbor search is linear in complexity, time performance requirements for large-scale data retrieval cannot be met. In an embodiment of FIG. 16, approximate nearest neighbor (ANN) search is used. An ANN server refers to a server or server cluster that calculates cosine similarities between the candidate items and the user embedding vectors based on an ANN algorithm. The ANN search may be a neighboring data item and is no longer limited to returning a most probable item. The retrieval efficiency is improved while the accuracy is within an acceptable range.

The recommendation system in the embodiment of FIG. 16 includes a match logic, a primary selection logic, and a ranking module.

The function of the match logic is to use the context-aware multi-service fusion model to provide match services for various service scenarios, and to obtain short-term behavior features of various services of the user, such as short-term clicking and reading behaviors and basic attribute information and social information of the user. The trained model is used for encoding, and then some items with highest similarity scores are selected according to the strategy described in the foregoing embodiments for match and recommendation. The match logic performs data pulling (matching) based on the profile information of a specific user and according to various dimensions such as personalization and popularity. It is assumed that the ANN server matches K candidate items.

The primary selection logic is mainly responsible for preliminary filtering of matched results according to specific rules (for example, user article relevance, timeliness, region, and diversity). For example, the calculated user embedding vectors in the context-aware multi-service fusion model are used as features in the primary selection, to provide fine semantic features for the primary selection. K' candidate items are selected from the K candidate items. K' is a positive integer greater than or equal to 1 and less than or equal to K, so as to reduce the calculation scale of the ranking module. For the recommendation system, the primary selection logic is optional.

The ranking module uses the features extracted by a feature generation system to calculate the estimated CTR so as to rank the K' candidate items and present same to the user. In some other embodiments, after the ranking module, some service strategies, such as removing reads, diverse recommendation, adding advertisements, may also be added, to form final recommendation results and present same to the user.

In the data processing method provided in the embodiments of the present disclosure, features related to context service scenarios are used to dynamically adjust weights of different service feature groups, so that importance of different features is modeled for different service scenarios. In addition, multi-head self-attention is used to learn mutual relationships between feature groups. The designed model can effectively merge various service information, to provide a framework for effective merging of various services, and implement recommendation for all services using the same model. In addition, if a to-be-recommended service is a new service, the framework can also cleverly use the existing mature service to assist with cold start recommendation of the new service.

Apparatus embodiments of the present disclosure are described below, which may be used to perform the above data processing method of the present disclosure. For details not disclosed in the apparatus embodiments of the present disclosure, refer to the foregoing embodiments of the data processing method of the present disclosure.

Figure 17:
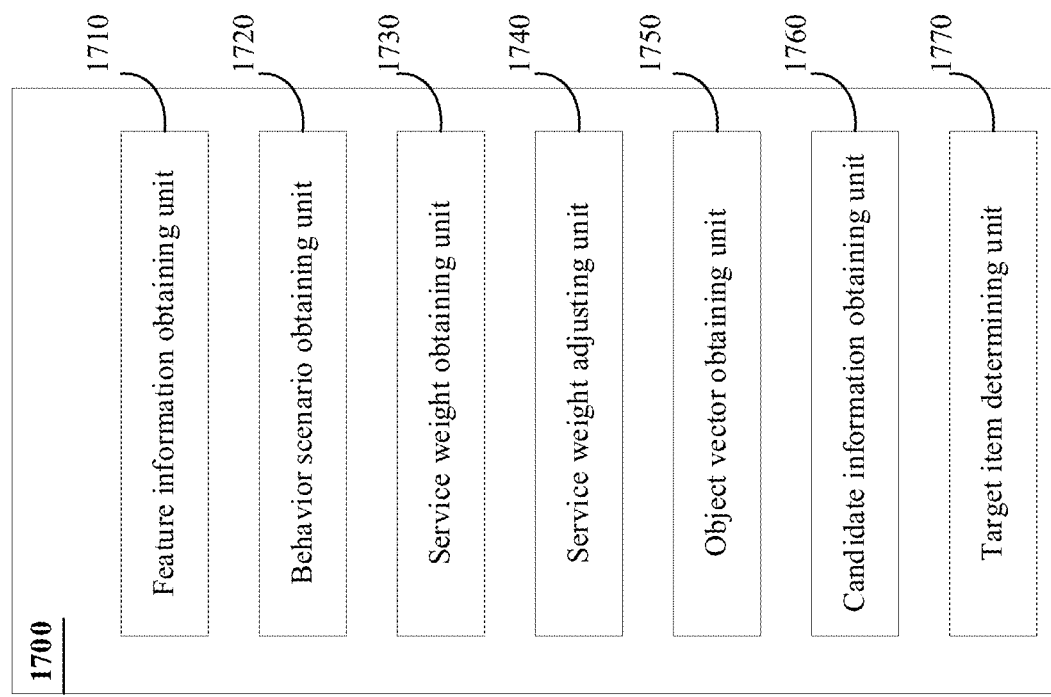
FIG. 17 is a block diagram of a data processing apparatus according to an embodiment of the present disclosure.

FIG. 17 is a block diagram of a data processing apparatus according to an embodiment of the present disclosure.

Referring to FIG. 17, a data processing apparatus 1700 according to an embodiment of the present disclosure may include a feature information obtaining unit 1710, a behavior scenario obtaining unit 1720, a service weight obtaining unit 1730, a service weight adjusting unit 1740, an object vector obtaining unit 1750, a candidate information obtaining unit 1760, and a target item determining unit 1770.

Specifically, the feature information obtaining unit 1710 may be configured to obtain a first service behavior feature, a second service behavior feature, and a service scenario feature of an object from service history data associated with the object. The behavior scenario obtaining unit 1720 may be configured to: generate a first service embedding vector according to the first service behavior feature, generate a second service embedding vector according to the second service behavior feature, and generate a scenario representation vector according to the service scenario feature. The service weight obtaining unit 1730 may be configured to obtain a first weight of the first service embedding vector and a second weight of the second service embedding vector according to the scenario representation vector, the first service embedding vector, and the second service embedding vector. The service weight adjusting unit 1740 may be configured to: generate a first service feature vector according to the first service embedding vector and the first weight of the first service embedding vector, and generate a second service feature vector according to the second service embedding vector and the second weight of the second service embedding vector. The object vector obtaining unit 1750 may be configured to obtain an object embedding vector according to the first service feature vector and the second service feature vector. The candidate information obtaining unit 1760 may be configured to obtain a plurality of first service candidate items. The target item determining unit 1770 may be configured to determine a first service target item from the plurality of first service candidate items according to the object embedding vector.

In an exemplary embodiment, the behavior scenario obtaining unit 1720 may include: a feature value vector obtaining unit, which may be configured to vectorize a feature value in the first service behavior feature, to obtain a feature value vector in the first service behavior feature; a first service representation vector generation unit, which may be configured to generate a first service representation vector according to the feature value vector in the first service behavior feature; and a first service embedding vector generation unit, which may be configured to perform spatial mapping on the first service representation vector, to generate the first service embedding vector.

In an exemplary embodiment, the service scenario feature may include a service type, a net type, and a channel ID. The behavior scenario obtaining unit 1720 may include: a service scenario feature vectorization unit, which may be configured to respectively vectorize feature values in the service type, the net type, and the channel ID, to obtain a feature value vector of the service type, a feature value vector of the net type, and a feature value vector of the channel ID; and a scenario representation vector generation unit, which may be configured to generate the scenario representation vector according to the feature value vector of the service type, the feature value vector of the net type, and the feature value vector of the channel ID.

In an exemplary embodiment, the service weight obtaining unit 1730 may obtain the first weight of the first service embedding vector by Formula (1).

In an exemplary embodiment, the object vector obtaining unit 1750 may include: a first and second matrix generation unit, which may be configured to generate a first matrix and a second matrix according to the first service feature vector and the second service feature vector; a third matrix generation unit, which may be configured to generate a third matrix according to the first service feature vector; a first, second, and third sub-matrix obtaining unit, which may be configured to: obtain n first sub-matrices according to the first matrix, obtain n second sub-matrices according to the second matrix, and obtain n third sub-matrices according to the third matrix, where n is a positive integer greater than 1; a first head matrix generation unit, which may be configured to generate n first head matrices according to the n first sub-matrices, the n second sub-matrices, and the n third sub-matrices; and a first service feature group vector generation unit, which may be configured to generate a first service feature group vector according to the n first head matrices.

In an exemplary embodiment, the first service feature group vector generation unit may include: a first head matrix stitching unit, which may be configured to stitch the n first head matrices; and a first service feature group vector obtaining unit, which may be configured to generate the first service feature group vector according to the stitched n first head matrices and a mapping matrix.

In an exemplary embodiment, the object vector obtaining unit 1750 may further include: a fourth matrix generation unit, which may be configured to generate a fourth matrix according to the second service feature vector; a fourth sub-matrix obtaining unit, which may be configured to obtain n fourth sub-matrices according to the fourth matrix; a second head matrix generation unit, which may be configured to generate n second head matrices according to the n first sub-matrices, the n second sub-matrices, and the n fourth sub-matrices; and a second service feature group vector generation unit, which may be configured to generate a second service feature group vector according to the n second head matrices.

In an exemplary embodiment, the data processing apparatus 1700 may further include: an object attribute feature obtaining unit, which may be configured to obtain a basic attribute feature and a social feature of the object; a basic attribute vector generation unit, which may be configured to generate a basic attribute vector according to the basic attribute feature; and a social embedding vector generation unit, which may be configured to generate a social embedding vector according to the social feature.

In an exemplary embodiment, the object vector obtaining unit 1750 may further include: a stitched feature vector obtaining unit, which may be configured to obtain a stitched feature vector according to the first service feature group vector, the second service feature group vector, the basic attribute vector, and the social embedding vector; and an object embedding vector obtaining unit, which may be configured to process the stitched feature vector by using an FNN, to obtain the object embedding vector.

In an exemplary embodiment, the target item determining unit 1770 may include: a similarity calculation unit, which may be configured to calculate a similarity between the object embedding vector and each of the plurality of first service candidate items; and a first service target item selecting unit, which may be configured to select the first service target item from the plurality of first service candidate items according to the similarity.

In an exemplary embodiment, the data processing apparatus 1700 may further include: an estimated CTR calculation unit, which may be configured to calculate an estimated CTR of the first service target item; a ranking unit, which may be configured to rank the first service target item according to the estimated CTR; and an item presentation unit, which may be configured to present the ranked first service target item at the object.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

According to the foregoing descriptions of the implementations, a person skilled in the art may readily understand that the exemplary implementations described herein may be implemented by using software, or may be implemented by combining software and necessary hardware. Therefore, the technical solutions according to the implementations of the present disclosure may be implemented in the form of a software product. The software product may be stored in a non-transitory computer-readable storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art can easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

It is to be understood that the present disclosure is not limited to the accurate structures described above and shown in the accompanying drawings, and various modifications and changes can be made without departing from the scope of the present disclosure. The scope of the present disclosure is limited only by the appended claims. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

INDUSTRIAL PRACTICABILITY

In the embodiments of this application, a first service behavior feature, a second service behavior feature, and a service scenario feature of an object from service history data associated with the object are obtained. A first service embedding vector is generated according to the first service behavior feature, a second service embedding vector is generated according to the second service behavior feature, and a scenario representation vector is generated according to the service scenario feature. A first weight of the first service embedding vector and a second weight of the second service embedding vector are obtained according to the scenario representation vector, the first service embedding vector, and the second service embedding vector. A first service feature vector is generated according to the first service embedding vector and the first weight of the first service embedding vector, and a second service feature vector is generated according to the second service embedding vector and the second weight of the second service embedding vector. An object embedding vector is obtained according to the first service feature vector and the second service feature vector. A plurality of first service candidate items are obtained. A first service target item is determined from the plurality of first service candidate items according to the object embedding vector. Therefore, by comprehensively considering the service scenario that the object is currently in and assistance information from other services for the currently to-be-recommended service, the accuracy of a matched item can be improved, thereby helping to improve the accuracy of a personalized recommendation result in the end.

What is claimed is:

1. A data processing method performed by an electronic device, the method comprising:
   obtaining a first service behavior feature, a second service behavior feature, and a service scenario feature of an object from service history data associated with the object, wherein the service scenario feature comprises a service type, a net type, and a channel ID;
   generating a first service embedding vector according to the first service behavior feature, generating a second service embedding vector according to the second service behavior feature, and generating a scenario representation vector according to the service scenario feature;
   obtaining a first weight of the first service embedding vector and a second weight of the second service embedding vector according to the scenario representation vector, the first service embedding vector, and the second service embedding vector;
   generating a first service feature vector according to the first service embedding vector and the first weight of the first service embedding vector, and generating a second service feature vector according to the second service embedding vector and the second weight of the second service embedding vector;
   automatically learning, using a self-attention mechanism, a relevance between the first service feature vector and the second service feature vector by determining a correlation between features of different services to generate an object embedding vector according to the first service feature vector and the second service feature vector, wherein the object embedding vector is obtained by:
      generating a first matrix and a second matrix according to the first service feature vector and the second service feature vector;
      obtaining n first sub-matrices according to the first matrix and n second sub-matrices according to the second matrix, wherein n is a positive integer greater than 1;
      generating n first head matrices according to the n first sub-matrices and the n second sub-matrices;
      stitching the n first head matrices; and
      generating the service feature group vector according to the stitched n first head matrices and a mapping matrix;
   obtaining a plurality of first service candidate items;
   determining a first service target item from the plurality of first service candidate items according to the object embedding vector by determining a similarity between the object embedding vector and each of the plurality of first service candidate items; and
   presenting the first service target item to a user to provide a personalized recommendation result based on the object embedding vector.

2. The data processing method according to claim 1, wherein the generating a first service embedding vector according to the first service behavior feature comprises:
   vectorizing a feature value in the first service behavior feature, to obtain a feature value vector in the first service behavior feature;
   generating a first service representation vector according to the feature value vector in the first service behavior feature; and
   performing spatial mapping on the first service representation vector, to generate the first service embedding vector.

3. The data processing method according to claim 1, wherein the generating a scenario representation vector according to the service scenario feature comprises:
   respectively vectorizing feature values in the service type, the net type, and the channel ID, to obtain a feature value vector of the service type, a feature value vector of the net type, and a feature value vector of the channel ID; and
   generating the scenario representation vector according to the feature value vector of the service type, the feature value vector of the net type, and the feature value vector of the channel ID.

4. The data processing method according to claim 1, wherein the generate an object embedding vector according to the first service feature vector and the second service feature vector further comprises:
   generating a fourth matrix according to the second service feature vector;
   obtaining n fourth sub-matrices according to the fourth matrix;
   generating n second head matrices according to the n first sub-matrices, the n second sub-matrices, and the n fourth sub-matrices; and
   generating a second service feature group vector according to the n second head matrices.

5. The data processing method according to claim 4, further comprising:
   obtaining a basic attribute feature and a social feature of the object;
   generating a basic attribute vector according to the basic attribute feature; and
   generating a social embedding vector according to the social feature.

6. The data processing method according to claim 5, wherein the obtaining an object embedding vector according to the first service feature vector and the second service feature vector further comprises:
   obtaining a stitched feature vector according to the first service feature group vector, the second service feature group vector, the basic attribute vector, and the social embedding vector; and
   processing the stitched feature vector by using a feed forward neural network (FNN), to obtain the object embedding vector.

7. The data processing method according to claim 1, wherein the determining a first service target item from the plurality of first service candidate items according to the object embedding vector comprises:
  calculating a similarity between the object embedding vector and each of the plurality of first service candidate items; and
  selecting the first service target item from the plurality of first service candidate items according to the similarities.

8. The data processing method according to claim 1, further comprising:
  calculating an estimated click through rate (CTR) of the first service target item;
  ranking the first service target item according to the estimated CTR; and
  presenting the ranked first service target item at the object.

9. The data processing method according to claim 1, further comprising:
  determining an estimated CTR of the first service target item;
  determining a service strategy matching the first service target item according to a use environment of the first service target item; and
  ranking the first service target item according to the estimated CTR of the first service target item and the service strategy.

10. An electronic device, comprising:
  one or more processors; and
  a storage apparatus, configured to store one or more programs, the one or more programs, when executed by the one or more processors, causing the electronic device to implement a data processing method including:
  obtaining a first service behavior feature, a second service behavior feature, and a service scenario feature of an object from service history data associated with the object, wherein the service scenario feature comprises a service type, a net type, and a channel ID;
  generating a first service embedding vector according to the first service behavior feature, generating a second service embedding vector according to the second service behavior feature, and generating a scenario representation vector according to the service scenario feature;
  obtaining a first weight of the first service embedding vector and a second weight of the second service embedding vector according to the scenario representation vector, the first service embedding vector, and the second service embedding vector;
  generating a first service feature vector according to the first service embedding vector and the first weight of the first service embedding vector, and generating a second service feature vector according to the second service embedding vector and the second weight of the second service embedding vector;
  automatically learning, using a self-attention mechanism, a relevance between the first service feature vector and the second service feature vector by determining a correlation between features of different services to generate an object embedding vector according to the first service feature vector and the second service feature vector, wherein the object embedding vector is obtained by:
  generating a first matrix and a second matrix according to the first service feature vector and the second service feature vector;
  obtaining n first sub-matrices according to the first matrix and n second sub-matrices according to the second matrix, wherein n is a positive integer greater than 1;
  generating n first head matrices according to the n first sub-matrices and the n second sub-matrices;
  stitching the n first head matrices; and
  generating the service feature group vector according to the stitched n first head matrices and a mapping matrix;
  obtaining a plurality of first service candidate items;
  determining a first service target item from the plurality of first service candidate items according to the object embedding vector by determining a similarity between the object embedding vector and each of the plurality of first service candidate items; and
  presenting the first service target item to a user to provide a personalized recommendation result based on the object embedding vector.

11. The electronic device according to claim 10, wherein the generating a first service embedding vector according to the first service behavior feature comprises:
  vectorizing a feature value in the first service behavior feature, to obtain a feature value vector in the first service behavior feature;
  generating a first service representation vector according to the feature value vector in the first service behavior feature; and
  performing spatial mapping on the first service representation vector, to generate the first service embedding vector.

12. The electronic device according to claim 10, wherein the generating a scenario representation vector according to the service scenario feature comprises:
  respectively vectorizing feature values in the service type, the net type, and the channel ID, to obtain a feature value vector of the service type, a feature value vector of the net type, and a feature value vector of the channel ID; and
  generating the scenario representation vector according to the feature value vector of the service type, the feature value vector of the net type, and the feature value vector of the channel ID.

13. The electronic device according to claim 10, wherein the determining a first service target item from the plurality of first service candidate items according to the object embedding vector comprises:
  calculating a similarity between the object embedding vector and each of the plurality of first service candidate items; and
  selecting the first service target item from the plurality of first service candidate items according to the similarities.

14. The electronic device according to claim 10, wherein the method further comprises:
  calculating an estimated click through rate (CTR) of the first service target item;
  ranking the first service target item according to the estimated CTR; and
  presenting the ranked first service target item at the object.

15. The electronic device according to claim 10, wherein the method further comprises:
  determining an estimated CTR of the first service target item;
  determining a service strategy matching the first service target item according to a use environment of the first service target item; and ranking the first service target item according to the estimated CTR of the first service target item and the service strategy.

16. A non-transitory computer-readable storage medium, storing a computer program, the program, when executed by a processor of an electronic device, causing the electronic device to implement a data processing method including:
- obtaining a first service behavior feature, a second service behavior feature, and a service scenario feature of an object from service history data associated with the object, wherein the service scenario feature comprises a service type, a net type, and a channel ID;
- generating a first service embedding vector according to the first service behavior feature, generating a second service embedding vector according to the second service behavior feature, and generating a scenario representation vector according to the service scenario feature;
- obtaining a first weight of the first service embedding vector and a second weight of the second service embedding vector according to the scenario representation vector, the first service embedding vector, and the second service embedding vector;
- generating a first service feature vector according to the first service embedding vector and the first weight of the first service embedding vector, and generating a second service feature vector according to the second service embedding vector and the second weight of the second service embedding vector;
- automatically learning, using a self-attention mechanism, a relevance between the first service feature vector and the second service feature vector by determining a correlation between features of different services to generate an object embedding vector according to the first service feature vector and the second service feature vector, wherein the object embedding vector is obtained by:
  - generating a first matrix and a second matrix according to the first service feature vector and the second service feature vector;
  - obtaining n first sub-matrices according to the first matrix and n second sub-matrices according to the second matrix, wherein n is a positive integer greater than 1;
  - generating n first head matrices according to the n first sub-matrices and the n second sub-matrices;
  - stitching the n first head matrices; and
  - generating the service feature group vector according to the stitched n first head matrices and a mapping matrix;
- obtaining a plurality of first service candidate items;
- determining a first service target item from the plurality of first service candidate items according to the object embedding vector by determining a similarity between the object embedding vector and each of the plurality of first service candidate items; and
- presenting the first service target item to a user to provide a personalized recommendation result based on the object embedding vector.

17. The non-transitory computer-readable storage medium according to claim 16, wherein the determining a first service target item from the plurality of first service candidate items according to the object embedding vector comprises:
- calculating a similarity between the object embedding vector and each of the plurality of first service candidate items; and
- selecting the first service target item from the plurality of first service candidate items according to the similarities.

18. The non-transitory computer-readable storage medium according to claim 16, wherein the method further comprises:
- calculating an estimated click through rate (CTR) of the first service target item;
- ranking the first service target item according to the estimated CTR; and
- presenting the ranked first service target item at the object.

19. The non-transitory computer-readable storage medium according to claim 16, wherein the method further comprises:
- determining an estimated CTR of the first service target item;
- determining a service strategy matching the first service target item according to a use environment of the first service target item; and
- ranking the first service target item according to the estimated CTR of the first service target item and the service strategy.

* * * * *